United States Patent
Nam et al.

(10) Patent No.: US 12,232,141 B2
(45) Date of Patent: Feb. 18, 2025

(54) USER EQUIPMENT MONITORING CAPABILITY FOR MULTIPLE SLOT PHYSICAL DOWNLINK CONTROL CHANNEL MONITORING

(71) Applicant: QUALCOMM Incorporated, San Diego, CA (US)

(72) Inventors: Wooseok Nam, San Diego, CA (US); Jing Sun, San Diego, CA (US); Tao Luo, San Diego, CA (US); Xiaoxia Zhang, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/361,792

(22) Filed: Jul. 28, 2023

(65) Prior Publication Data

US 2024/0032050 A1   Jan. 25, 2024

Related U.S. Application Data

(63) Continuation of application No. 17/223,624, filed on Apr. 6, 2021, now Pat. No. 11,758,552.

(51) Int. Cl.
*H04W 72/23* (2023.01)
*H04W 72/044* (2023.01)
*H04W 72/51* (2023.01)

(52) U.S. Cl.
CPC ........... *H04W 72/23* (2023.01); *H04W 72/51* (2023.01); *H04W 72/044* (2013.01)

(58) Field of Classification Search
CPC ............. H04W 72/042; H04W 72/044; H04W 72/048
See application file for complete search history.

(56) References Cited

U.S. PATENT DOCUMENTS 11,240,738 B2 *   2/2022   Horiuchi ............... H04L 5/0064
11,528,089 B2 * 12/2022   Salah ..................... H04L 1/0038
(Continued)

FOREIGN PATENT DOCUMENTS

CN   111356213 A   6/2020
CN   112312562 A   2/2021
(Continued)

OTHER PUBLICATIONS

Apple Inc:"PDCCH Monitoring Enhancements for NR between 52.6GHz and 71 GHz", 3GPP TSG RAN WG1#104-e, R1-2101373, Jan. 25, 2021, 6 Pages.
(Continued)

*Primary Examiner* — Eric Nowlin
(74) *Attorney, Agent, or Firm* — Arun Swain

(57) ABSTRACT

Various aspects of the present disclosure generally relate to wireless communication. In some aspects, a user equipment (UE) may transmit an indication of a physical downlink control channel (PDCCH) monitoring capability that indicates an amount of time between two consecutive PDCCH monitoring windows, a number of slots to be included in a PDCCH monitoring window, and a number of consecutive symbols in a slot to be associated with PDCCH monitoring.

(Continued)

The UE may receive a PDCCH monitoring configuration that is based at least in part on the PDCCH monitoring capability. Numerous other aspects are described.

20 Claims, 10 Drawing Sheets

(56) References Cited

U.S. PATENT DOCUMENTS

| | | | |
|---|---|---|---|
| 11,627,567 B2* | 4/2023 | Salah | H04W 72/23 370/329 |
| 11,659,423 B2* | 5/2023 | Taherzadeh Boroujeni | H04L 5/0051 370/329 |
| 11,758,552 B2* | 9/2023 | Nam | H04L 5/0094 370/330 |
| 11,968,550 B2* | 4/2024 | Nam | H04L 27/26025 |
| 12,082,013 B2* | 9/2024 | Nam | H04W 72/0446 |
| 2019/0110279 A1 | 4/2019 | Behravan et al. | |
| 2020/0329389 A1 | 10/2020 | Hosseini et al. | |
| 2021/0029561 A1 | 1/2021 | Lin et al. | |
| 2021/0037607 A1* | 2/2021 | Hamidi-Sepehr | H04W 24/08 |
| 2021/0160002 A1* | 5/2021 | Salah | H04L 1/0039 |
| 2021/0185652 A1 | 6/2021 | Rune | |
| 2021/0195450 A1* | 6/2021 | Lindoff | H04W 24/08 |
| 2021/0337408 A1* | 10/2021 | Nam | H04W 72/53 |
| 2021/0337520 A1* | 10/2021 | Salah | H04L 5/0094 |
| 2021/0385802 A1 | 12/2021 | Bae | |
| 2022/0007292 A1 | 1/2022 | Seo et al. | |
| 2022/0014950 A1* | 1/2022 | Taherzadeh Boroujeni | H04L 5/0053 |
| 2022/0015127 A1 | 1/2022 | Yang et al. | |
| 2022/0046610 A1* | 2/2022 | Cheng | H04L 5/0091 |
| 2022/0150734 A1 | 5/2022 | Nimbalker et al. | |
| 2022/0201515 A1 | 6/2022 | Chatterjee et al. | |
| 2022/0225393 A1* | 7/2022 | Gao | H04L 5/0053 |
| 2022/0232401 A1* | 7/2022 | Nam | H04L 5/0053 |
| 2022/0322311 A1 | 10/2022 | Nam et al. | |
| 2022/0338035 A1* | 10/2022 | Nam | H04W 72/23 |
| 2023/0069404 A1* | 3/2023 | Kittichokechai | H04L 5/0096 |
| 2023/0155873 A1* | 5/2023 | Yao | H04L 5/0094 370/329 |
| 2023/0189305 A1* | 6/2023 | Oteri | H04L 5/0053 370/329 |
| 2024/0014989 A1* | 1/2024 | Lin | H04L 5/0092 |

FOREIGN PATENT DOCUMENTS

| | | | |
|---|---|---|---|
| CN | 112753189 A | 5/2021 | |
| CN | 111356213 B | 7/2021 | |
| CN | 113765639 A | 12/2021 | |
| CN | 114071769 A | 2/2022 | |
| CN | 114095139 A * | 2/2022 | H04L 1/0038 |
| CN | 114375592 A * | 4/2022 | H04L 5/001 |
| CN | 115118407 A * | 9/2022 | H04L 5/0008 |
| CN | 115398852 A * | 11/2022 | H04L 5/0053 |
| CN | 114095139 B * | 9/2023 | H04L 1/0038 |
| CN | 117061062 A * | 11/2023 | H04L 1/0038 |
| CN | 115380500 B * | 5/2024 | H04L 27/26025 |
| CN | 114375592 B * | 6/2024 | H04L 5/001 |
| CN | 115398852 B * | 8/2024 | H04L 5/0053 |
| EP | 3902335 A1 | 10/2021 | |
| EP | 3920624 A1 | 12/2021 | |
| EP | 3952196 A1 | 2/2022 | |
| EP | 4030821 A1 * | 7/2022 | H04L 5/001 |
| KR | 20210150286 A | 12/2021 | |
| KR | 20220018440 A | 2/2022 | |
| TW | 202207742 A | 2/2022 | |
| WO | WO-2020072963 A1 | 4/2020 | |
| WO | WO-2020125411 A1 | 6/2020 | |
| WO | WO-2020206086 A1 | 10/2020 | |
| WO | WO-2021062843 A1 * | 4/2021 | H04L 5/001 |
| WO | WO-2021161266 A1 * | 8/2021 | H04L 5/0053 |
| WO | WO-2021222275 A1 * | 11/2021 | H04L 27/26025 |
| WO | WO-2022200824 A1 * | 9/2022 | H04L 5/0008 |
| WO | WO-2022213269 A1 | 10/2022 | |
| WO | WO-2022246339 A2 | 11/2022 | |
| WO | WO-2023011588 A1 | 2/2023 | |
| WO | WO-2023011589 A1 | 2/2023 | |

OTHER PUBLICATIONS

CATT: "PDCCH Monitoring Adaptation", 3GPP TSG RAN WG1 #104-e, R1-2100395, e-Meeting, Jan. 25-Feb. 5, 2021, vol. RAN WG1, No. e-Meeting, Jan. 25, 2021-Feb. 5, 2021, Jan. 19, 2021, 5 Pages, XP051970998, The whole document.
CATT: "PDCCH Monitoring Enhancements for up to 71 GHz Operation", Jan. 25, 2021, 3GPP TSG RAN WG1 #104-e, Tdoc: R1-2000371, 4 Pages.
CEWIT: "Discussion on PDCCH Monitoring Enhancements for NR above 52.6GHz", R1-2101321, Jan. 25, 2021, 3GPP TSG RAN WG1 #104-e, pp. 1-4.
CEWIT: "Discussions on PDCCH Monitoring for Reduced Capability Devices", 3GPP TSG-RAN WG1 Meeting #104-e, R1-2101248, e-Meeting, Jan. 25-Feb. 5, 2021, pp. 1-3.
Huawei, et al., "Enhancement on PDCCH Monitoring", Jan. 25, 2021, 3GPP TSG RAN WG1 #104-e, R1-2100241, 5 Pages.
Intel Corporation: "Discussion on PDCCH Monitoring Enhancements for Extending NR up to 71 GHz", Jan. 25, 2021, R1-2100644, 3GPP TSG RAN WG1 #104-e, pp. 1-6.
Interdigital Inc: "Discussions on PDCCH Monitoring Enhancements", Jan. 25, 2021, R1-2100837, 3GPP TSG RAN WG1 #104-e, 5 Pages.
International Search Report and Written Opinion—PCT/US2022/071095—ISA/EPO—Jul. 4, 2022.
Lenovo, et al., "PDCCH Monitoring at Reduced Capability UE", Jan. 25, 2021, R1-2100997, 3GPP TSG RAN WG1 #104-e, 4 Pages.
Lenovo, et al., "PDCCH Monitoring Enhancements for N R from 52.6 GHz to 71 GHz", Jan. 25, 2021, 3GPP TSG RAN WG1 #104-e, Tdoc: R1-2100058, 4 Pages.
LG Electronics: "PDCCH Monitoring Enhancements to Support N R above 52.6 GHz", Jan. 25, 2021, R1-2100893, 3GPP TSG RAN WG1 #104-e, 6 Pages.
Mediatek Inc: "PDCCH Monitoring Enhancement for 52.6-71 GHz NR Operation", Jan. 25, 2021, R1-2100608, 3GPP TSG RAN WG1 #104-e, 3 Pages.
Moderator (Lenovo) : "Feature Lead Summary#3 for [104-e-NR-52-71GHZ-02] on PDCCH Monitoring Enhancements", 3GPP Draft, 3GPP TSG RAN WG1#104-e, R1-2102242, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Feb. 8, 2021 (Feb. 8, 2021), XP051977804, 112 Pages, Retrieved from the Internet: URL: https://ftp.3gpp.org/tsg_ran/WG1_RL1/TSGR1_104-e/Docs/R1-2102242.zip R1-2102242.docx [Retrieved on Feb. 8, 2021] Ericsson Contribution, p. 39.
Nokia, et al., "PDCCH Monitoring Enhancements", Jan. 25, 2021, 3GPP TSG RAN WG1 #104-e, Tdoc: R1-2100258, 5 Pages.
OPPO: "Discussion on PDCCH Monitoring", Jan. 25, 2021, 3GPP TSG RAN WG1 #104-e, R1-2100150, 5 Pages.
Samsung: "PDCCH Monitoring Enhancements for NR from 52.6 GHz to 71", 3GPP Draft, 3GPP TSG RAN WG1 #104, R1-2101195, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2020-Feb. 5, 2020, Jan. 9, 2021 (Jan. 19, 2021), XP051971409, 5 Pages, Retrieved from the Internet: URL: https://ftp.3gpp.org/tsg_ran/WG1_RL1/TSGR1_104-e/Docs/R1-2101195.zip R1-2101195 PDCCH Monitoring for Above 52.6GHz.docx [Retrieved on Jan. 19, 2021] Sect. 2.1.
Spreadtrum Communications: "Discussion on PDCCH Monitoring Enhancement for NR beyond 52.6 GHz", Jan. 25, 2021, R1-2100817, 3GPP TSG RAN WG1 #104-e, 3 Pages.
VIVO: "Discussions on PDCCH Monitoring Enhancements for NR Operation from 52.6-71GHZ", R1-2100430, 3GPP TSG RAN WG1 #104-e, 3rd Generation Partnership Project, Mobile Competence

(56) References Cited

OTHER PUBLICATIONS

Centre, 650, Route Des Lucioles, F-06921, Sophia-Antipolis Cedex, France, vol. RAN WG1, No. e-Meeting, Jan. 25, 2021-Feb. 5, 2021, Jan. 18, 2021, XP051970352, 5 Pages, Section.2.1.1, Table 1.

Xiaomi: "PDCCH Monitoring Enhancement for NR 52.6-71 GHz", 3GPP TSG RAN WG1 #104, R1-2101110, e-Meeting, Jan. 25-Feb. 5, 2021, pp. 1-3.

ZTE, et al., "Discussion on the PDCCH Monitoring Enhancements for 52.6 to 71 GHz", Jan. 25, 2021, 3GPP TSG RAN WG1#104-e, R1-2100074, pp. 1-4.

* cited by examiner

USER EQUIPMENT MONITORING CAPABILITY FOR MULTIPLE SLOT PHYSICAL DOWNLINK CONTROL CHANNEL MONITORING

CROSS-REFERENCE TO RELATED APPLICATIONS

This application is a continuation of U.S. Non-Provisional application Ser. No. 17/223,624, entitled "USER EQUIPMENT MONITORING CAPABILITY FOR MULTIPLE SLOT PHYSICAL DOWNLINK CONTROL CHANNEL MONITORING", filed Apr. 6, 2021, which is hereby incorporated by reference in its entirety as if fully set forth below and for all applicable purposes.

FIELD OF THE DISCLOSURE

Aspects of the present disclosure generally relate to wireless communication and to techniques and apparatuses for user equipment (UE) monitoring capability for multiple slot physical downlink control channel (PDCCH) monitoring.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: transmit an indication of a physical downlink control channel (PDCCH) monitoring capability that indicates an amount of time between two consecutive PDCCH monitoring windows, a number of slots to be included in a PDCCH monitoring window, and a number of consecutive symbols in a slot to be associated with PDCCH monitoring; and receive a PDCCH monitoring configuration that is based at least in part on the PDCCH monitoring capability.

In some aspects, a base station for wireless communication includes a memory and one or more processors, coupled to the memory, configured to: receive, from a UE, an indication of a PDCCH monitoring capability that indicates an amount of time between two consecutive PDCCH monitoring windows, a number of slots to be included in a PDCCH monitoring window, and a number of consecutive symbols in a slot to be associated with PDCCH monitoring; and transmit, to the UE, a PDCCH monitoring configuration that is based at least in part on the PDCCH monitoring capability.

In some aspects, a method of wireless communication performed by a UE includes transmitting an indication of a PDCCH monitoring capability that indicates an amount of time between two consecutive PDCCH monitoring windows, a number of slots to be included in a PDCCH monitoring window, and a number of consecutive symbols in a slot to be associated with PDCCH monitoring; and receiving a PDCCH monitoring configuration that is based at least in part on the PDCCH monitoring capability.

In some aspects, a method of wireless communication performed by a base station includes receiving, from a UE, an indication of a PDCCH monitoring capability that indicates an amount of time between two consecutive PDCCH monitoring windows, a number of slots to be included in a PDCCH monitoring window, and a number of consecutive symbols in a slot to be associated with PDCCH monitoring; and transmitting, to the UE, a PDCCH monitoring configuration that is based at least in part on the PDCCH monitoring capability.

In some aspects, a non-transitory computer-readable medium storing a set of instructions for wireless communication includes one or more instructions that, when executed by one or more processors of a UE, cause the UE to: transmit an indication of a PDCCH monitoring capability that indicates an amount of time between two consecutive PDCCH monitoring windows, a number of slots to be included in a PDCCH monitoring window, and a number of consecutive symbols in a slot to be associated with PDCCH monitoring; and receive a PDCCH monitoring configuration that is based at least in part on the PDCCH monitoring capability.

In some aspects, a non-transitory computer-readable medium storing a set of instructions for wireless communication includes one or more instructions that, when executed by one or more processors of a base station, cause the base station to: receive, from a UE, an indication of a PDCCH monitoring capability that indicates an amount of time between two consecutive PDCCH monitoring windows, a number of slots to be included in a PDCCH monitoring window, and a number of consecutive symbols in a slot to be associated with PDCCH monitoring; and transmit, to the UE, a PDCCH monitoring configuration that is based at least in part on the PDCCH monitoring capability.

In some aspects, an apparatus for wireless communication includes means for transmitting an indication of a PDCCH monitoring capability that indicates an amount of time between two consecutive PDCCH monitoring windows, a number of slots to be included in a PDCCH monitoring window, and a number of consecutive symbols in a slot to be associated with PDCCH monitoring; and means for receiving a PDCCH monitoring configuration that is based at least in part on the PDCCH monitoring capability.

In some aspects, an apparatus for wireless communication includes means for receiving, from a UE, an indication of a PDCCH monitoring capability that indicates an amount of time between two consecutive PDCCH monitoring windows, a number of slots to be included in a PDCCH monitoring window, and a number of consecutive symbols in a slot to be associated with PDCCH monitoring; and means for transmitting, to the UE, a PDCCH monitoring configuration that is based at least in part on the PDCCH monitoring capability.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
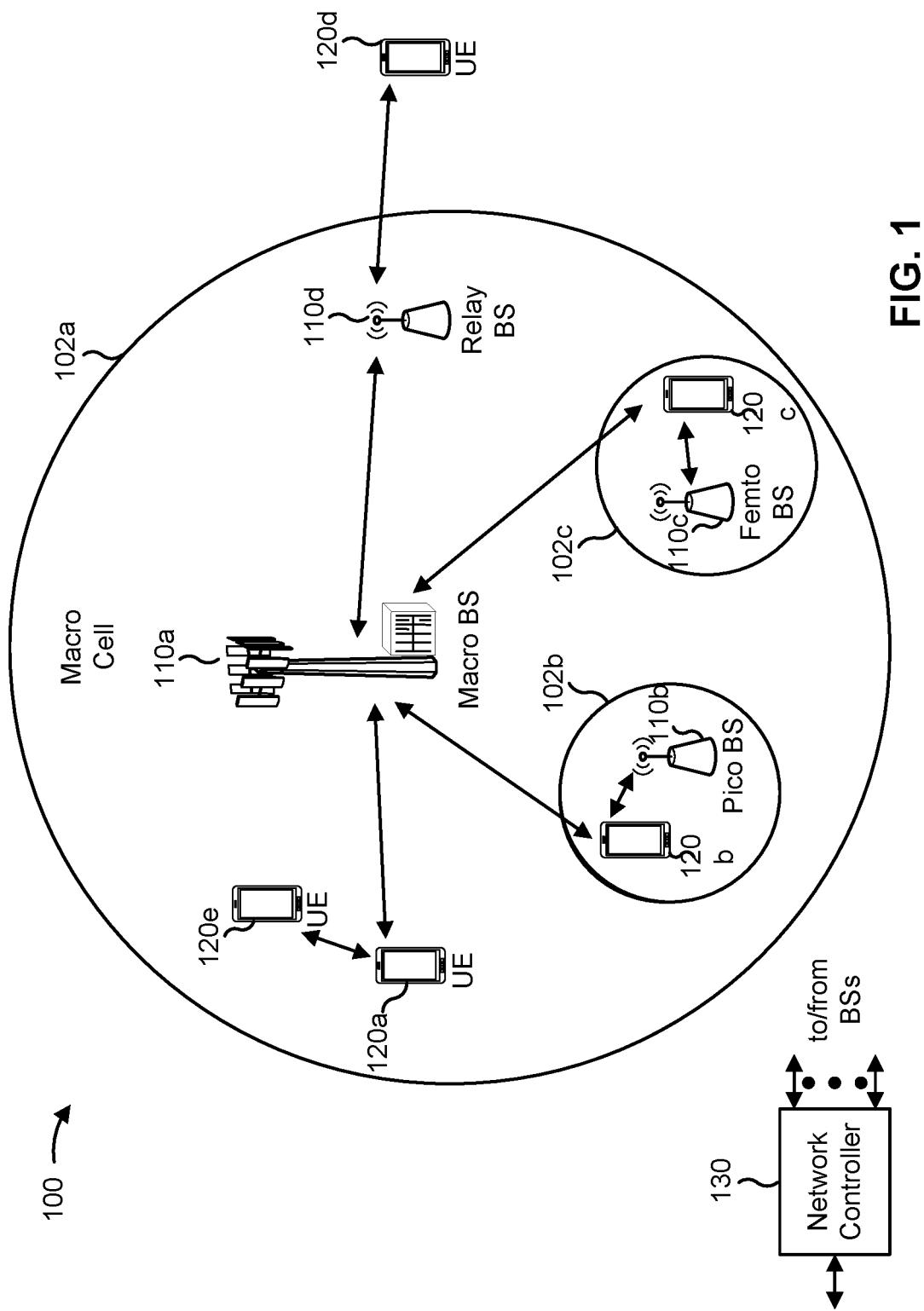
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2T) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
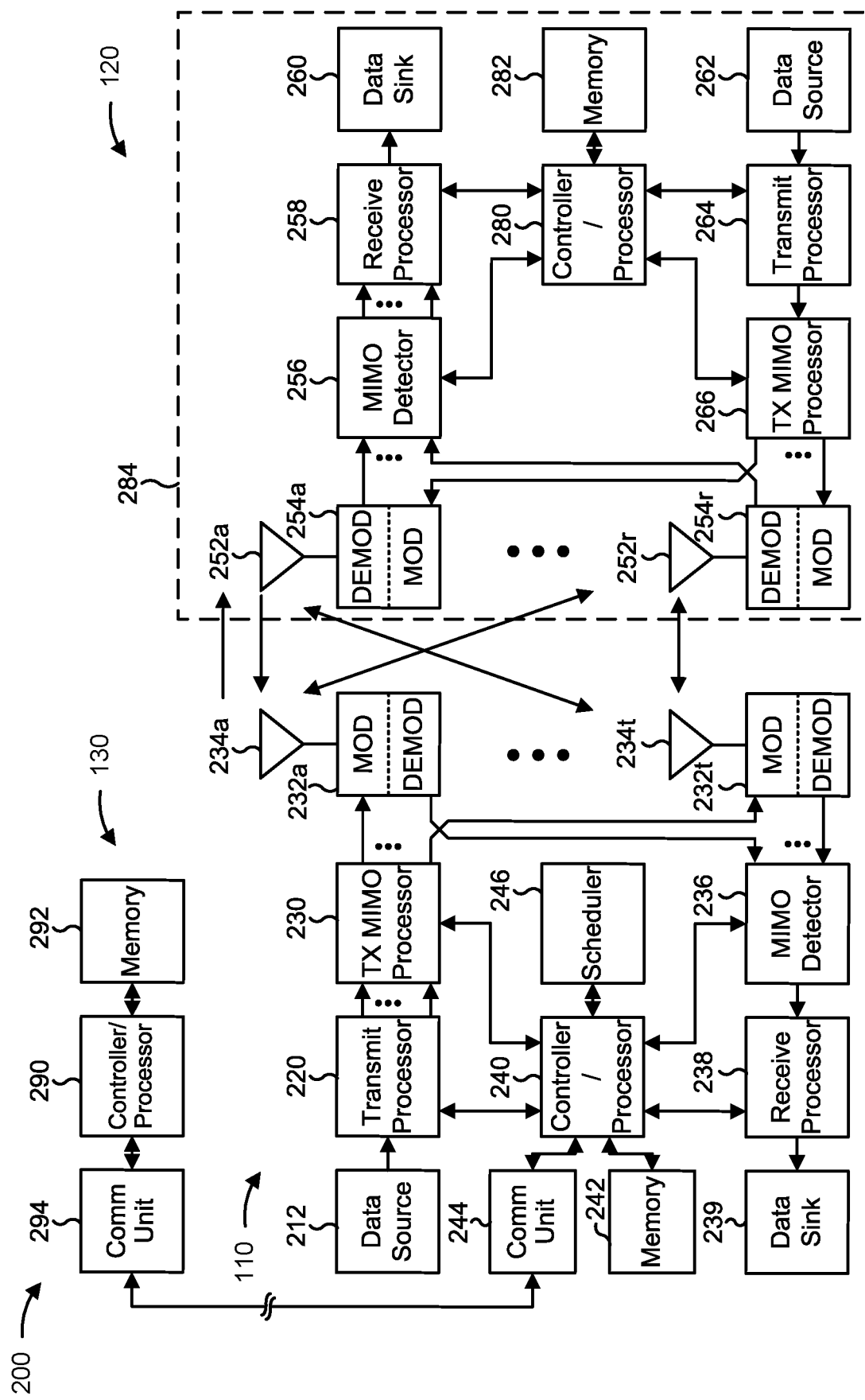
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-8).

Controller/processor 240 of base station 110, controller/processor 280 of UE 120, and/or any other component(s) of FIG. 2 may perform one or more techniques associated with UE monitoring capability for multiple slot physical downlink control channel (PDCCH) monitoring, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE 120 includes means for transmitting an indication of a PDCCH monitoring capability that indicates an amount of time between two consecutive PDCCH monitoring windows, a number of slots to be included in a PDCCH monitoring window, and a number of consecutive symbols in a slot to be associated with PDCCH monitoring; and/or means for receiving a PDCCH monitoring configuration that is based at least in part on the PDCCH monitoring capability. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station 110 includes means for receiving, from a UE, an indication of a PDCCH monitoring capability that indicates an amount of time between two consecutive PDCCH monitoring windows, a number of slots to be included in a PDCCH monitoring window, and a number of consecutive symbols in a slot to be associated with PDCCH monitoring; and/or means for transmitting, to the UE, a PDCCH monitoring configuration that is based at least in part on the PDCCH monitoring capability. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
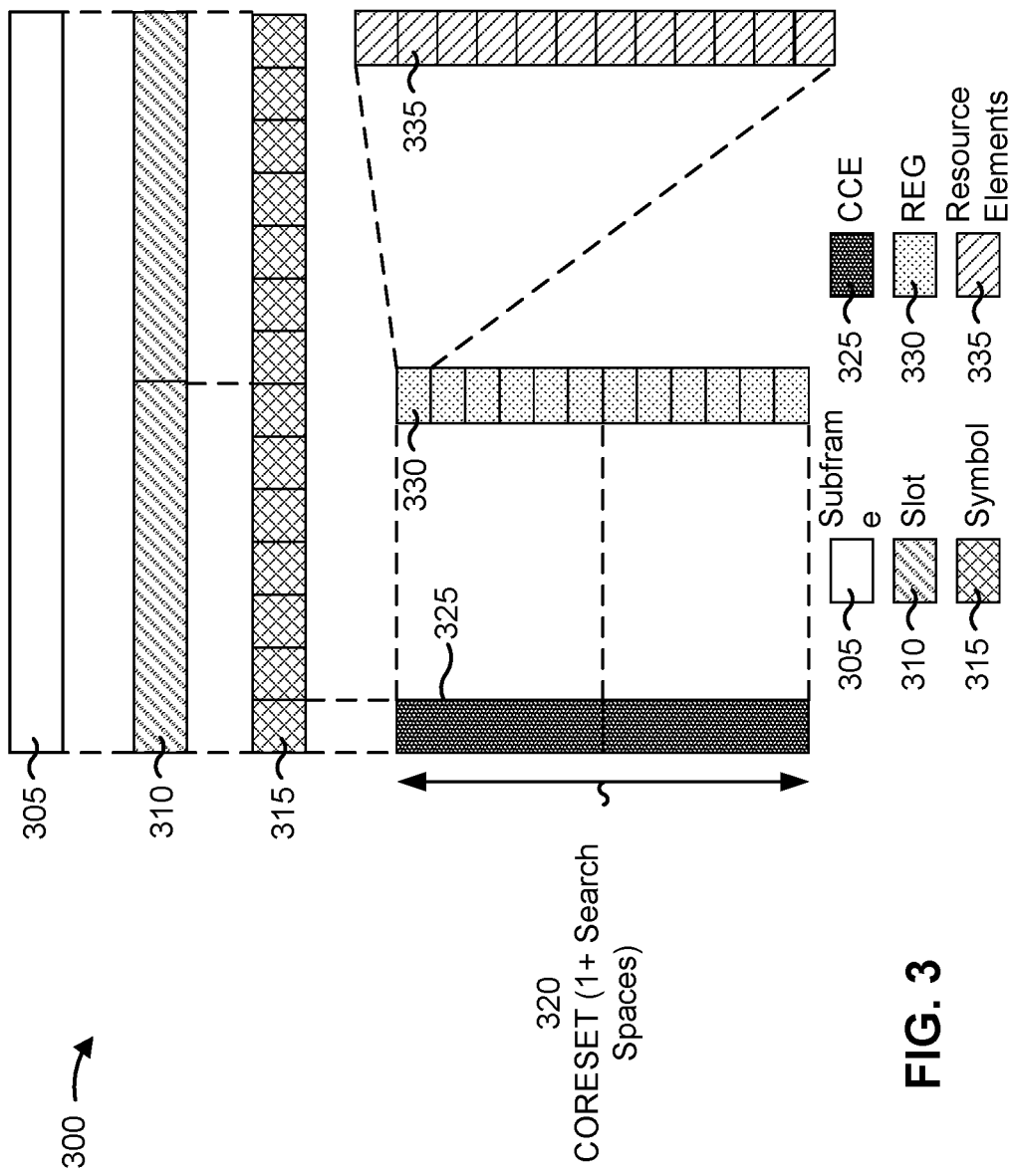
FIG. 3 is a diagram illustrating an example resource structure for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, or another quantity of slots). In some aspects, different types of transmission time intervals (TTIs) may be used, other than subframes and/or slots. A slot 310 may include multiple symbols 315, such as 14 symbols per slot.

The potential control region of a slot 310 may be referred to as a control resource set (CORESET) 320 and may be structured to support an efficient use of resources, such as by flexible configuration or reconfiguration of resources of the CORESET 320 for one or more PDCCHs and/or one or more physical downlink shared channels (PDSCHs). In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the base station for the transmission of DCI. In FIG. 3, an aggregation level of two is shown as an example, corresponding to two CCEs 325 in a slot 310. In some aspects, different aggregation levels may be used, such as 1, 2, 4, 8, 16, or another aggregation level.

Each CCE 325 may include a fixed quantity of resource element groups (REGs) 330, shown as 6 REGs 330, or may include a variable quantity of REGs 330. In some aspects, the quantity of REGs 330 included in a CCE 325 may be indicated by a REG bundle size parameter. An REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs) and/or an aggregation level being used. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space (SS) set.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

In some RATs, such as 3GPP Release 15 of 5G/NR, different PDCCH monitoring capabilities are defined. As an example, a feature group (FG) 3-1 may indicate that the UE is capable of monitoring all PDCCH candidates for scheduling data that are within the first few symbols of a slot (e.g., the first 3 symbols of the slot). An FG 3-2 may indicate that the UE is capable of monitoring PDCCH candidates (for a UE specific search space set) that are within the same span of any three consecutive symbols of a slot. As another example, an FG 3-5b may define a PDCCH monitoring capability based at least in part on a span concept. A slot can include multiple spans, and a span can include one or more PDCCH candidates. Different span configurations may be supported. Span configurations are described in more detail in connection with FIG. 4.

As described above, in a 5G/NR network, a base station transmits a PDCCH (e.g., including control information, such as DCI) based at least in part on a search space set. A given search space set defines candidates that may carry a PDCCH within the search space set, where each candidate is associated with one or more CCEs. In a 5G/NR network, a base station may flexibly schedule and transmit the PDCCH. In other words, transmission of the PDCCH in the 5G/NR network is not limited to a particular set of frequency resources and/or time resources in a given radio frame, as in the case of, for example, an LTE network. PDCCH frequency domain and time domain resources are configured on a per CORESET basis. Thus, once a UE is configured with a CORESET, the UE has information that identifies which resource blocks in the frequency domain are assigned to a search space set associated with the CORESET, as well as information that identifies a number of consecutive symbols occupied by the search space set.

In order to receive a PDCCH associated with one or more candidates of a given UE-specific search space set (i.e., a search space set that may carry control information specific to one or more particular UEs), a UE may attempt to decode a PDCCH in candidates of the search space set. For example, the UE may determine one or more CCE indices associated with a candidate, and may attempt to decode the PDCCH (e.g., using a blind decoding (BD) procedure). In some cases (e.g., 3GPP Release 15 of 5G/NR), limits on the number of non-overlapping CCEs and BDs are defined on a per-slot basis. Thus, a large number of CCEs/BDs (in the extreme case, all of them) may be configured within one span. This significantly increases the UE complexity, particularly when attempting to conform to processing timelines that are suitable for supporting ultra-reliable low latency communication (URLLC) applications. On the other hand, if the scheduler chooses to distribute the CCEs/BDs across different spans, the number of CCE/BDs per span may not be sufficient. For example, for a subcarrier spacing (SCS) of 30 kilohertz (kHz) and a span capability of (X, Y)=(2, 2), each span can have 8 CCEs. Hence, only one candidate of aggregation level=8 can be supported. Span capabilities are described in more detail in connection with FIG. 4.

To address the above issues, 3GPP Release 16 of 5G/NR introduces a PDCCH monitoring capability that is based at least in part on a span configuration of the UE. To improve scheduling flexibility, the number of non-overlapping CCEs and BDs per slot are increased, as compared to 3GPP Release 15 of 5G/NR. Furthermore, to relax the UE complexity, a per-span CCE/BD limit (also referred to as a per-span capability) may be specified. This PDCCH monitoring capability may be referred to herein as a span-based monitoring capability or a Release 16 monitoring capability, whereas the PDCCH monitoring capability defined on a per-slot basis may be referred to as a slot-based monitoring capability or a Release 15 monitoring capability.

As indicated above, FIG. 3 is provided as an example. Other examples may differ from what is described with respect to FIG. 3. For example, other CORESET configurations and/or PDCCH monitoring configurations may be defined or configured for a UE.

Figure 4:
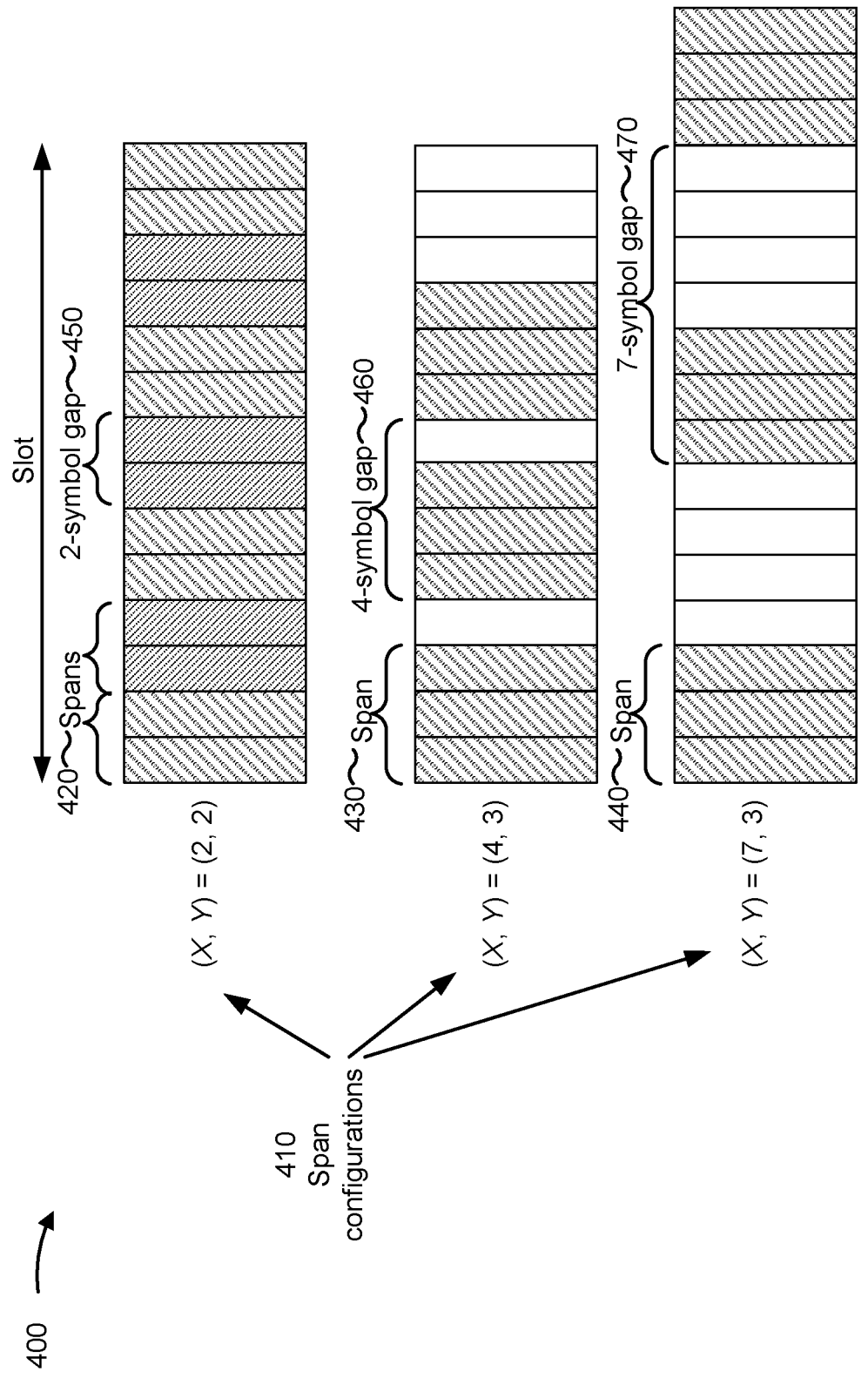
FIG. 4 is a diagram illustrating an example of spans in a slot for physical downlink control channel (PDCCH) monitoring, in accordance with the present disclosure.

FIG. 4 is a diagram illustrating an example 400 of spans in a slot for PDCCH monitoring, in accordance with the present disclosure. FIG. 4 shows a set of slots that are associated with respective span configurations, shown by reference number 410. A span configuration may identify a minimum gap X between the starting symbol of two spans and a maximum span duration Y.

The spans corresponding to span configurations (2, 2), (4, 3), and (7, 3) are shown by reference numbers 420, 430, and 440, respectively. The spans shown by reference number 420 are shown using alternating diagonal hatching, since these spans are adjacent to each other and would be difficult to differentiate otherwise. The spans shown by reference numbers 430 and 440 are separated by symbols that are not included in a span, which are shown by white rectangles.

The minimum gap X is shown for span configurations (2, 2), (4, 3), and (7, 3) by reference numbers 450, 460, and 470, respectively. It should be noted that X defines a minimum gap, so starting symbols of a pair of spans associated with span configuration (2, 2) may be two or more symbols apart from each other. Furthermore, the maximum span duration Y defines a maximum span duration, so the span 430 may have one-symbol or two-symbol spans while still being within the definition of the span configuration (4, 3). As shown in FIG. 4, for a span configuration (2, 2), up to 7 spans may be included in a single slot (e.g., a slot with 14 symbols). For a span configuration (4, 3), up to 3 spans may in included in a single slot (e.g., a slot with 14 symbols). For a span configuration (7, 3), up to 2 spans may in included in a single slot (e.g., a slot with 14 symbols).

A span configuration may be associated with a per-span capability for a number of BDs and/or a number of non-overlapped CCEs in a span. A per-span capability for a number of BDs may identify a maximum number of BDs that can be configured in a span 420/430/440, and a per-span capability for a number of non-overlapped CCEs may identify a maximum number of non-overlapped CCEs that can be configured in a span 420/430/440. These per-span capabilities may also be referred to as a BD limit and a CCE limit, respectively. A BD limit may also be referred to as a PDCCH candidate limit.

A UE may report a capability regarding one or more span configurations supported by the UE. For example, the UE may report that the UE supports one or more of span configurations (2, 2), (4, 3), and/or (7, 3). The UE may determine which span configuration is to be used for a communication based at least in part on a search space configuration. For example, a search space configuration may indicate search space candidates, and the UE may identify a span configuration that aligns with the search space candidates. In the case that the search space configuration aligns with two or more span configurations, the UE may use a largest CCE limit and/or a BD limit of the CCE limits and/or BD limits associated with the two or more span configurations. The BD limit may identify a number of PDCCH candidates that the UE is required to monitor.

The UE may use a maximum CCE/BD limit and a maximum total CCE/BD limit to perform distribution of BDs and CCEs. A maximum CCE/BD limit may identify a maximum number of blind decodes or non-overlapped CCEs per span and per carrier, and a maximum total CCE/BD limit may identify a maximum number of blind decodes or non-overlapped CCEs across spans on active downlink bandwidth part(s) of scheduling cells if the spans on the scheduling cells are aligned. In some aspects, the maximum total CCE limit may be referred to herein as C_tot or $C_{PDCCH}^{total}$ and the maximum total BD limit may be referred to herein as M_tot or $M_{PDCCH}^{total}$. CCE limits and BD limits may be different for different parameters, such as different span configurations, numerologies, numbers of TRPs (e.g., single-TRP versus multi-TRP carriers), and so on. The notation used to describe a CCE limit or BD limit may indicate one or more parameters associated with the CCE. For example, a maximum total CCE limit for a given subcarrier spacing (SCS) and a given span configuration may be denoted by $C_{PDCCH}^{total,(X,Y),\mu}$.

As indicated above, FIG. 4 is provided as an example. Other examples may differ from what is described with respect to FIG. 4.

In some cases, a UE and a base station may communicate using high frequency bands, such as the 60 GHz band. The high frequency bands may be associated with larger bandwidths. For example, in some higher frequency bands, a bandwidth for a channel (e.g., a single carrier bandwidth) may be up to 2 GHz (compared to lower bands, such as FR2 bands, in which up to a 400 MHz bandwidth may be supported). To use a same subcarrier spacing in the higher frequency bands (e.g., with the larger bandwidth) as the subcarrier spacing of the lower frequency bands (e.g., with the lower bandwidths), a fast Fourier transform (FFT) size for the higher frequency bands may need to be increased (e.g., as compared to the FFT size using the for the lower frequency bands). For example, for the lower frequency bands, up to a 4096 point FFT size may be used. However, to use the same subcarrier spacing in the higher frequency bands with the larger bandwidth, the FFT size used to generate a signal for the channel (e.g., with the larger bandwidth) may need to be increased (e.g., from the 4096 point FFT size supported for the lower frequency bands). However, using a larger FFT size adds significant computational complexity associated with generating the signal.

Therefore, rather than increasing the FFT size for the higher frequency bands, a subcarrier spacing for the higher frequency bands may be increased (e.g., compared to the subcarrier spacing used in the lower frequency bands). For example, for the higher frequency bands, a 960 kHz or a 480 kHz subcarrier spacing may be supported (e.g., compared to the up to 120 kHz subcarrier spacing supported for the lower frequency bands, such as the FR2 frequency bands). Therefore, a signal for the larger bandwidth of the higher frequency bands may be generated using a same FFT size (e.g., as the FFT size used for the lower frequency bands) by using a larger subcarrier spacing, as described above. However, increasing the subcarrier spacing results in a symbol duration (or symbol length) decreasing. For example, a symbol duration may be defined or determined as 1/SCS. Therefore, increasing the subcarrier spacing results in a shorter duration for a symbol (e.g., and a shorter duration for a slot). For example, for a subcarrier spacing of 960 kHz, a slot duration (or a slot length) may be 1/64 milliseconds. For a subcarrier spacing of 480 kHz, a slot duration (or slot length) may be 1/32 milliseconds. Therefore, using the larger subcarrier spacing results in a shorter slot duration as compared to the lower frequency bands, which may have a slot duration of 1/8 milliseconds in the FR2 bands, for example.

As a result, there may be a larger number of PDCCH monitoring occasions in a given length of time due to the shorter slot duration, leading to a proportionately higher PDCCH monitoring load for a given UE (e.g., due to the UE performing multiple blind decodings in search spaces). Therefore, a per-slot PDCCH monitoring capability of the UE may be decreased as the subcarrier spacing size increased. For example, limits on the number of non-overlapping CCEs and BDs defined on a per-slot basis may decrease for the larger subcarrier spacings (e.g., 960 kHz subcarrier spacing and/or 480 kHz subcarrier spacing) due to the reduced slot duration. In some cases, the limits on the number of non-overlapping CCEs and BDs for the larger subcarrier spacings may only allow for a small number (e.g., less than 10) CCEs and/or BDs to be available for a UE in a single slot. This significantly reduces scheduling flexibility for the wireless network (e.g., for the base station) due to the small number of CCEs and/or BDs that can be configured for a given UE in a single slot.

Additionally, when a UE is monitoring PDCCH candidates, if no valid PDCCH grants are detected in a PDCCH monitoring occasions, then the UE may transition to a sleep mode (e.g., a micro-sleep mode) to conserve power. For example, the UE may monitor PDCCH candidates during a first 3 symbols of a slot. The UE may complete decoding a few symbols later (e.g., symbol 5 of the slot) and may determine that no PDCCH grants were detected. The UE may transition to a sleep mode for the remainder of the slot (e.g., during symbols 6 through 14) to conserve power. However, an effectiveness of the sleep mode (or an ability of the UE to enter the sleep mode) may be based on a time gap between two PDCCH monitoring occasions. For example, if the time gap between two PDCCH monitoring occasions is too small (e.g., does not satisfy a time gap threshold), then the UE may be unable to transition to the sleep mode. Therefore, when using the larger subcarrier spacings (e.g., as described above), opportunities for the UE to enter a sleep mode (e.g., a micro-sleep mode) may be limited or non-existent. As a result, power consumption of a UE may be increased (e.g., in a connected mode) because of the shorter slot durations limiting the ability of the UE to enter a sleep mode, as described above.

Therefore, a UE may be configured to monitor the PDCCH once every few slots (e.g., rather than at least once for each slot) to address the problems described above. For example, a search set periodicity may be configured to enable the UE to monitor the PDCCH once every few slots, rather than once per slot. However, a per-slot PDCCH monitoring capability of the UE (e.g., a per-slot CCE limit and/or a per-slot BD limit) may still be applied by the network (e.g., a base station) when configuring and/or scheduling the UE, even if the UE is not configured to monitor PDCCH candidates in every slot. For example, the per-slot CCE limit and/or the per-slot BD limit may be based on an assumption that the UE is configured to monitor PDCCH candidates in every slot. Therefore, the values of the per-slot CCE limits and/or the per-slot BD limits may be less than an actual PDCCH monitoring capability of the UE when the UE is configured to monitor the PDCCH once every few slots (e.g., rather than at least once for each slot). As a result, the UE may be configured and/or scheduled with fewer CCEs and/or fewer BDs than the UE is capable of supporting, as the network (e.g., a base station) may apply the per-slot PDCCH monitoring capability of the UE when configuring and/or scheduling the UE. This reduces a scheduling flexibility and limits opportunities for the UE to receive PDCCH grants from the network.

Some techniques and apparatuses described herein enable a UE to report a PDCCH monitoring capability for multiple slot PDCCH monitoring. As used herein, "multiple slot PDCCH monitoring" or "multi-slot PDCCH monitoring" may refer to a scenario in which the UE is configured to monitor PDCCH candidates in one or more slots, but not every slot. For example, the PDCCH monitoring capability for multiple slot PDCCH monitoring may define a CCE limit and/or a BD limit that is based on an assumption that the UE is configured to monitor the PDCCH once every few slots (e.g., rather than every slot). In some aspects, the PDCCH monitoring capability may define an amount of time (e.g., a number of slots or a number of symbols) between two consecutive PDCCH monitoring windows, where a PDCCH monitoring window is one or more slots in which the UE may be configured with a PDCCH monitoring occasion. In some aspects, the PDCCH monitoring capability may define a number of slots to be included in a PDCCH monitoring window (e.g., in each PDCCH monitoring window). In some aspects, the PDCCH monitoring capability may define a number of consecutive symbols in a slot to be associated with PDCCH monitoring (e.g., a number of consecutive symbols to be included in a span associated with PDCCH monitoring).

In some aspects, a per-slot PDCCH monitoring capability may be used by a UE and a base station when using the higher subcarrier spacings, such as for an initial access procedure and/or before the UE has reported the PDCCH monitoring capability for multiple slot PDCCH monitoring. After the UE reports the PDCCH monitoring capability for multiple slot PDCCH monitoring to the base station, the base station may configure the UE with multi-slot based PDCCH monitoring (e.g., where the UE is not configured to monitor PDCCH candidates in every slot) based at least in part on the report PDCCH monitoring capability. As a result, CCE limits and/or BD limits used by the base station for scheduling the UE may be based on an assumption that the UE is not configured to monitor PDCCH candidates in every slot. Therefore, the CCE limits and/or BD limits may be larger than if a per-slot limit were to be used. This increases scheduling flexibility and increases opportunities for the UE to receive PDCCH grants from the base station. Moreover, configuring the UE with multi-slot based PDCCH monitoring (e.g., where the UE is not configured to monitor PDCCH candidates in every slot) when larger subcarrier spacings are used increases opportunities for the UE to enter a sleep mode (e.g., a micro-sleep mode) to conserve power, thereby improving battery life of the UE.

Figure 5:
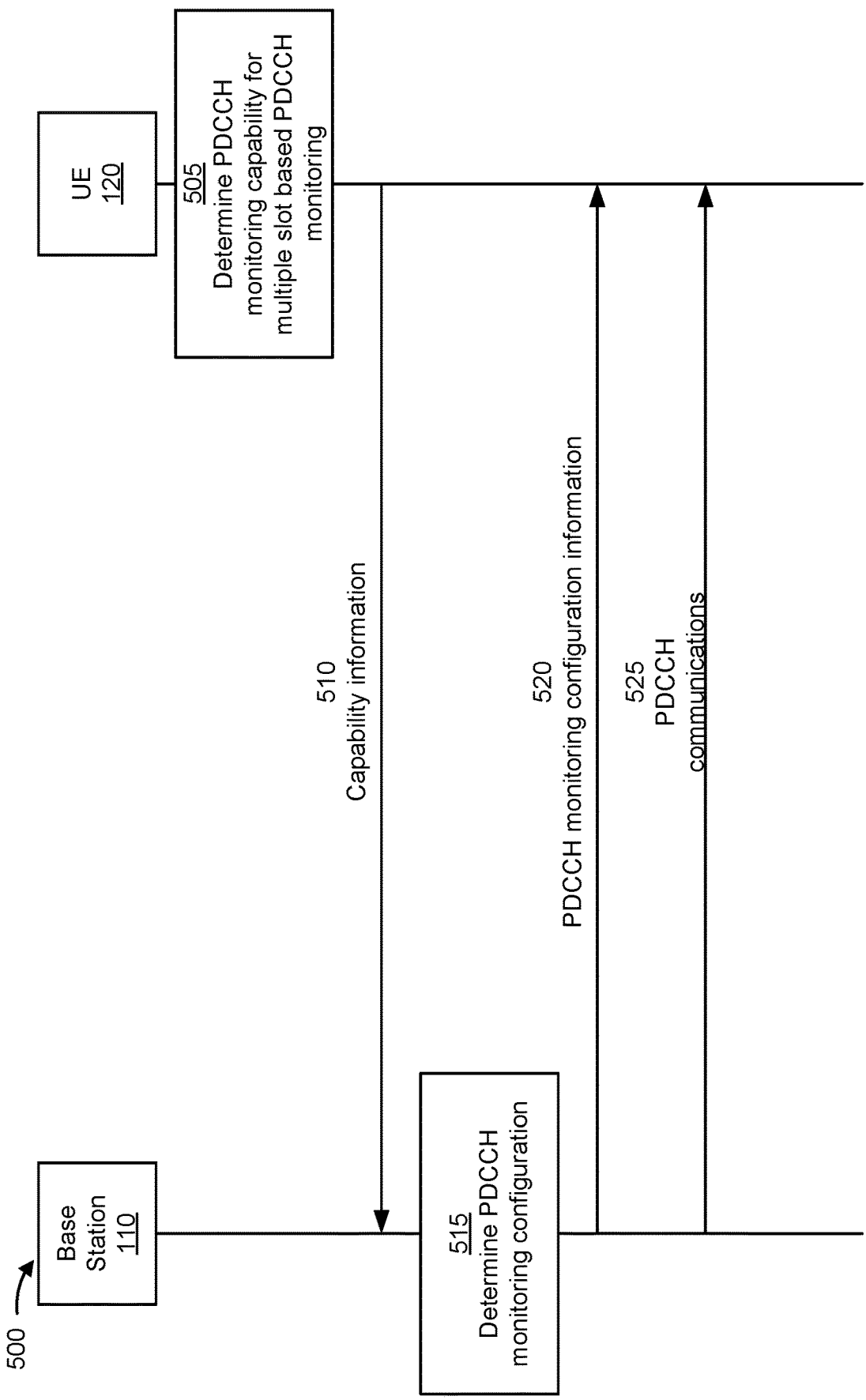
FIG. 5 is a diagram illustrating an example associated with reporting a UE monitoring capability for multiple slot PDCCH monitoring, in accordance with the present disclosure.

FIG. 5 is a diagram illustrating an example 500 associated with reporting a UE monitoring capability for multiple slot PDCCH monitoring, in accordance with the present disclosure. As shown in FIG. 5, a base station 110 and a UE 120 may communicate with one another in a wireless network, such as wireless network 100.

As shown by reference number 505, the UE 120 may determine one or more PDCCH monitoring capabilities of the UE 120 for multiple slot (multi-slot) PDCCH monitoring. In some aspects, the one or more PDCCH monitoring capabilities may be for large subcarrier spacings (e.g., for subcarrier spacings that are equal to or greater than a threshold, such as 480 kHz or 960 kHz). In some aspects, the UE 120 may determine PDCCH monitoring capability values of the UE 120. For example, the UE 120 may determine a PDCCH monitoring capability value that defines values for a combination of parameters (A, B, and C).

For example, the PDCCH monitoring value may identify or indicate an amount of time A (e.g., a minimum allowable amount of time or a minimum allowable separation) between two consecutive PDCCH monitoring windows. "PDCCH monitoring window" or "monitoring window" may refer to one or more slots (e.g., consecutive slots) during which the UE 120 is expected to monitor the PDCCH. The amount of time A may define an amount of time between the first slot of two consecutive PDCCH monitoring windows. For example, the amount of time A may define a minimum number of slots or a minimum number of symbols to be included between a first slot (e.g., a first symbol) of a first PDCCH monitoring window and a first slot (e.g., a first symbol) of a next PDCCH monitoring window that can be configured for the UE 120 in the time domain. In other words, the amount of time A between two consecutive PDCCH monitoring windows indicates a minimum amount of time between a first slot of a first PDCCH monitoring window and a first slot of a second PDCCH monitoring window when the first PDCCH monitoring window and the second PDCCH monitoring window are consecutive in a time domain. The amount of time A may define a minimum amount of time between a pair of PDCCH monitoring windows, such that a value of A of 4 slots indicates that the first slot of the pair of PDCCH monitoring windows are to be configured 4 or more slots apart.

In some aspects, the PDCCH monitoring value may identify or indicate a number of slots B to be included in a PDCCH monitoring window. For example, the number of slots B may indicate or define a number of consecutive slots (e.g., a maximum number of consecutive slots) to be included in each PDCCH monitoring window configured for the UE 120. In other words, the number of slots B may indicate or define a number of consecutive slots (e.g., a maximum number of consecutive slots) during which the UE 120 is expected to monitor the PDCCH. Reporting the number of slots B may enable the UE 120 to be configured to monitor PDCCH candidates during multiple consecutive slots, while also not being configured to monitor PDCCH candidates during every slot (e.g., based at least in part on reporting the amount of time A between two consecutive PDCCH monitoring windows).

In some aspects, the PDCCH monitoring value may identify or indicate a number of consecutive symbols C in a slot to be associated with PDCCH monitoring. For example, the number of consecutive symbols C may define a maximum span duration for each slot. In other words, the number of consecutive symbols C may define a maximum number of consecutive symbols within a slot during which the UE 120 is expected to (or can be configured to) monitor the PDCCH. For example, the number of consecutive symbols C may define a span length (e.g., a maximum span length) in a similar manner as the span-based PDCCH monitoring described above in connection with FIG. 4.

Therefore, the UE 120 may determine a PDCCH monitoring capability of the UE 120 as a combination of values (A, B, C). For example, the UE 120 may determine a PDCCH monitoring capability of the UE 120 as (2, 1, 3) which may indicate or define that the UE 120 supports a multi-slot PDCCH configuration including at least 2 slots between each PDCCH monitoring window, PDCCH monitoring windows that include 1 slot, and spans within each slot of no more than 3 symbols. In some aspects, one or more combinations of values for (A, B, C) may be defined. For example, a wireless communication standard, such as the 3GPP, may define one or more combinations of values for (A, B, C). The UE 120 may determine one or more combinations (from the combinations defined) that the UE 120 supports.

In some aspects, the UE 120 may determine a PDCCH monitoring capability (e.g., a combination of (A, B, C)) for one or more (or all) subcarrier spacings supported by the UE 120. For example, the UE 120 may determine a first PDCCH monitoring capability (e.g., a first combination of (A, B, C)) supported by the UE 120 for a subcarrier spacing of 480 kHz, and a second PDCCH monitoring capability (e.g., a second combination of (A, B, C)) supported by the UE 120 for a subcarrier spacing of 960 kHz. In some aspects, the first PDCCH monitoring capability and the second PDCCH monitoring capability may be the same or different. In some aspects, the UE 120 may determine one or more PDCCH monitoring capabilities (e.g., one or more combinations of (A, B, C)) for a subcarrier spacing supported by the UE 120. For example, for a subcarrier spacing (such as 480 kHz or 960 kHz), the UE 120 may determine a first PDCCH monitoring capability (e.g., a first combination of (A, B, C)) supported by the UE 120 for the subcarrier spacing and a second PDCCH monitoring capability (e.g., a second combination of (A, B, C)) supported by the UE 120 for the subcarrier spacing. For example, the UE 120 may support multiple PDCCH monitoring capabilities (e.g., multiple combinations of (A, B, C)) for a single subcarrier spacing.

In some aspects, the UE 120 may determine a per-slot PDCCH monitoring capability for the high subcarrier spacings (e.g., for a 480 kHz subcarrier spacing and/or for a 960 kHz subcarrier spacing). As described above, the per-slot PDCCH monitoring capability may indicate or be associated with a CCE limit and/or a BD limit. The per-slot CCE limit and/or the per-slot BD limit for the high subcarrier spacings (e.g., for a 480 kHz subcarrier spacing and/or for a 960 kHz subcarrier spacing) may be a low value (e.g., less than 10). However, the per-slot PDCCH monitoring capability for the high subcarrier spacings may be required for the UE 120 to be configured with a PDCCH monitoring configuration prior to the UE 120 reporting a PDCCH monitoring capability (e.g., a combination of (A, B, C)) for multi-slot PDCCH monitoring. For example, the base station 110 may configure the UE 120 with a PDCCH monitoring configuration (e.g., for an initial access procedure) based at least in part on a per-slot PDCCH monitoring capability of the UE 120 associated with a high subcarrier spacing (e.g., for a 480 kHz subcarrier spacing and/or for a 960 kHz subcarrier spacing) prior to the UE 120 transmitting a PDCCH monitoring capability (e.g., a combination of (A, B, C)) for multi-slot PDCCH monitoring.

In some aspects, a PDCCH monitoring capability (e.g., a combination of (A, B, C)) may be associated with a CCE limit and/or a BD limit. For example, for a subcarrier spacing, a CCE limit and/or a BD limit may be defined for a PDCCH monitoring capability (e.g., for a combination of (A, B, C)). For example, the PDCCH monitoring capability may indicate a maximum quantity of monitored PDCCH candidates (e.g., blind decodes) and/or a maximum quantity of non-overlapped CCEs that can be monitored by the UE 120 per serving cell. For example, a wireless communication standard, such as the 3GPP, may define the CCE limit and/or the BD limit for one or more PDCCH monitoring capabilities (e.g., one or more combinations of (A, B, C)) for one or more subcarrier spacings. For example, for a PDCCH monitoring capability, a first CCE limit may be defined for a first subcarrier spacing (e.g., 480 kHz) and a second CCE limit may be defined for a second subcarrier spacing (e.g., 960 kHz). Similarly, for the PDCCH monitoring capability, a first BD limit may be defined for a first subcarrier spacing (e.g., 480 kHz) and a second BD limit may be defined for a second subcarrier spacing (e.g., 960 kHz).

In some aspects, the maximum quantity of monitored PDCCH candidates (e.g., blind decodes) and/or a maximum quantity of non-overlapped CCEs may be defined for a PDCCH monitoring window (e.g., per PDCCH monitoring window). For example, BD/CCE counting, overbooking, and/or dropping may be applied (as described in more detail below) collectively for all PDCCH monitoring occasions in a PDCCH window (e.g., which may include multiple spans). In other words, BDs and/or CCEs monitored by the UE 120 in PDCCH monitoring occasions may be aggregated or summed for all PDCCH monitoring occasions (and/or all spans) in a PDCCH monitoring window.

In some aspects, the maximum quantity of monitored PDCCH candidates (e.g., blind decodes) and/or a maximum quantity of non-overlapped CCEs may be defined for a span (e.g., for each span in which the UE 120 is configured with PDCCH monitoring occasions). For example, BD/CCE counting, overbooking, and/or dropping may be applied for all PDCCH monitoring occasions in a span. In other words, BD/CCE counting, overbooking, and/or dropping may be applied individually for each span of C symbols in each slot of a PDCCH monitoring window.

As shown by reference number 510, the UE 120 may transmit, and the base station 110 may receive, an indication of a PDCCH monitoring capability of the UE 120 that indicates an amount of time (A) between two consecutive PDCCH monitoring windows, a number of slots (B) to be included in a PDCCH monitoring window, and/or a number of consecutive symbols (C) in a slot to be associated with PDCCH monitoring. In some aspects, the UE 120 may transmit an indication of a PDCCH monitoring capability (e.g., a combination of (A, B, C)) for each subcarrier spacing (e.g., for each high subcarrier spacing, such as 480 kHz and/or 960 kHz) supported by the UE 120. In some aspects, the UE 120 may transmit an indication of multiple PDCCH monitoring capabilities (e.g., multiple combinations of (A, B, C)) for a subcarrier spacing supported by the UE 120.

As described above, multiple combinations of (A, B, C) may be defined or otherwise fixed (for example, by a wireless communication standard). The UE 120 may transmit an indication of the combinations of (A, B, C), from the multiple combinations of (A, B, C) that are defined, that are supported by the UE 120. For example, the UE 120 may transmit, for a subcarrier spacing, an indication of one or more combinations of (A, B, C), from the multiple combinations of (A, B, C), that are supported by the UE 120.

In some aspects, the UE 120 may transmit the indication of the PDCCH monitoring capability via a UE capability reporting message and/or a UE assistance information message, among other examples. As described above, the indication of the PDCCH monitoring capability may enable the base station 110 to identify a CCE limit and/or a BD limit for the UE 120. For example, based at least in part on the indicated PDCCH monitoring capability, the base station 110 may determine a CCE limit and/or a BD limit for the UE 120 for multi-slot PDCCH monitoring.

As shown by reference number 515, the base station 110 may determine a PDCCH monitoring configuration for the UE 120 for multi-slot PDCCH monitoring based at least in part on an indicated PDCCH monitoring capability (e.g., an indicated combination of (A, B, C)). For example, prior to receiving the indicated PDCCH monitoring capability of the UE 120, the base station 110 may configure the UE 120 with a PDCCH monitoring configuration that is based at least in part on a per-slot capability (such as a Release 15 PDCCH monitoring capability described above). However, after receiving the indication of PDCCH monitoring capability from the UE 120, the base station 110 may configure the UE 120 with multi-slot PDCCH monitoring.

In some aspects, the base station 110 may determine a PDCCH monitoring configuration for the UE 120 for multi-slot PDCCH monitoring based at least in part on a subcarrier spacing to be used for communications between the UE 120 and the base station 110. For example, as described above, the UE 120 may report PDCCH monitoring capabilities for multiple subcarrier spacings. The base station 110 may determine a subcarrier spacing to be used for communications between the UE 120 and the base station 110. The base station 110 may determine the PDCCH monitoring capability (e.g., the combination of (A, B, C)) for the UE 120 based at least in part on the subcarrier spacing.

In some aspects, the base station 110 may determine one or more PDCCH monitoring occasions for the UE 120. In some aspects, the base station 110 may determine one or more PDCCH monitoring occasions to be configured in a slot associated with the PDCCH monitoring window. For example, the base station 110 may configure one or more PDCCH monitoring occasions within a span included in the slot (e.g., a span of up to C consecutive symbols within the slot). For example, for a single slot, the base station 110 may determine that all PDCCH monitoring occasions are to be contained within one or more spans within the single slot. In some aspects, for the single slot, the base station 110 may determine or identify that only one span may be included in the single slot. Alternatively, in some aspects, multiple spans may be included in the single slot.

In some aspects, a position of a span in a slot may be fixed for slots associated with the PDCCH monitoring configuration. In other words, a position of a span in a slot may be the same for all slots associated with the PDCCH monitoring configuration. For example, in some aspects, a position of a span may be a first one or more symbols of the slot, where a quantity of the one or more symbols is the number of consecutive symbols C supported and/or indicated by the UE 120. As another example, a position of a span may be in any C consecutive symbols, but the C consecutive symbols may be the same across all slots. For example, when C has a value of 3, the position of a span in a slot may be fixed in symbols 5, 6, and 7 of each slot. Therefore, if a span is configured in a slot by the base station 110, the base station 110 may determine that the span must occur in one or more of symbols 5, 6, and/or 7 of the slot. By fixing the position of the span across slots, a complexity associated with PDCCH monitoring may be reduced as the UE 120 may not need to determine where the position of the span is to occur.

In some other aspects, the position of the span in a slot may not be fixed for slots associated with the PDCCH monitoring configuration. For example, the base station 110 may configure a span to occur in any C consecutive symbols, so long as the number of symbols of the span does not exceed C and so long as the span is configured in a slot that is included in a PDCCH monitoring window. By not fixing the position of the span across slots, a scheduling flexibility for the base station 110 may be increased as the base station 110 may be enabled to position a slot in any C consecutive symbols so long as the PDCCH monitoring capability of the UE 120 is satisfied.

As shown by reference number 520, the base station 110 may transmit, and the UE 120 may receive, PDCCH monitoring configuration information. For example, the base station 110 may transmit, and the UE 120 may receive, a PDCCH monitoring configuration that is based at least in part on a PDCCH monitoring capability (e.g., a combination of (A, B, C)) reported by the UE 120. For example, the base station 110 may transmit a CORESET configuration and/or a search space configuration for the UE 120 that is based at least in part on a PDCCH monitoring capability (e.g., a combination of (A, B, C)) reported by the UE 120. In some aspects, the base station 110 may transmit an indication of one or more PDCCH monitoring occasions for a slot associated with the PDCCH monitoring window. For example, the one or more PDCCH monitoring occasions may be included in a span of C symbols included in the slot. As described above, a position of the span of C symbols within the slot may be fixed (e.g., across all slot) or not fixed.

In some aspects, the PDCCH monitoring configuration may be based at least in part on the BD limit and/or the CCE limit associated with the reported PDCCH monitoring capability. For example, the base station 110 and/or the UE 120 may count or calculate a number of BD attempts to be performed by the UE 120 and/or a number of CCEs to be decoded by the UE 120. The base station 110 and/or the UE 120 compare the number of BD attempts to be performed by the UE 120 and/or a number of CCEs to be decoded by the UE 120 to the BD limit and/or the CCE limit associated with the PDCCH monitoring capability (e.g., a combination of (A, B, C)) reported by the UE 120. As described above, the number of BD attempts to be performed and/or a number of CCEs to be decoded may be counted or calculated per PDCCH monitoring window. In other words, the base station 110 and/or the UE 120 may count or calculate the number of BD attempts to be performed and/or a number of CCEs to be decoded across all PDCCH monitoring occasions configured in a PDCCH monitoring window. In some aspects, the number of BD attempts to be performed and/or a number of CCEs to be decoded may be counted or calculated per span. In other words, the base station 110 and/or the UE 120 may count or calculate the number of BD attempts to be performed and/or a number of CCEs to be decoded across all PDCCH monitoring occasions configured in a span.

In some aspects, the PDCCH monitoring configuration may configure a quantity of PDCCH candidates for the UE 120 that results in a quantity of BDs or a quantity of CCEs for the UE 120 that exceed or are not supported by the blind BD and/or the CCE limit. In some cases, this may be referred to as overbooking. In some aspects, such as where more than two cell groups are configured for the UE 120, the base station 110 may be permitted to configure overbooking in various cell groups configured for the UE 120. For example, the base station 110 may be permitted to overbook all cell groups configured for the UE 120. In this case, the base station 110 is permitted to configure the UE 120 to perform a quantity of BDs in cells of any cell group such that the quantity of blind decodes in a cell group exceeds or is not supported by the BD limit for the cell group. Moreover, the base station 110 is permitted to configure the UE 120 to process a quantity of CCEs in cells of any cell group such that the quantity of CCEs in the cell group exceeds or is not supported by the CCE limit for the cell group.

In some aspects, as described above, overbooking may be performed by the base station 110 on a per-PDCCH monitoring window basis. In other words, overbooking may be applied by aggregating and/or summing BDs and/or CCEs configured for the UE 120 in each PDCCH monitoring window. That is, the BD limit and/or the CCE limit may be defined as a maximum number of BDs and/or a maximum number of CCEs that can be configured for the UE 120 in all PDCCH monitoring occasions included in a single PDCCH monitoring window. In some aspects, overbooking may be performed by the base station 110 on a per-span basis. In other words, overbooking may be applied by aggregating and/or summing BDs and/or CCEs configured for the UE 120 in each span. That is, the BD limit and/or the CCE limit may be defined as a maximum number of BDs and/or a maximum number of CCEs that can be configured for the UE 120 in all PDCCH monitoring occasions included in a single span of C consecutive symbols.

In some aspects, when the calculated number of BDs or CCEs exceeds the BD or CCE limit, then the UE 120 may identify one or more particular pairs of PDCCH candidates to be dropped so that the BD or CCE limit is not exceeded. The UE 120 may apply a dropping rule to identify the pairs of PDCCH candidates to be dropped, as described below. The dropping rule may be preconfigured or predetermined for the UE 120 (e.g., based at least in part on a 3GPP standard), and/or may be indicated to the UE 120 by the base station 110. In some aspects, the dropping rule may be based at least in part on a search space identifier (SSID), which may be used to determine which PDCCH candidate pair(s) are to be dropped. Similar to the counting and overbooking described above, BD dropping or CCE dropping may be applied on a per PDCCH monitoring window basis or a per span basis. For example, a BD limit or CCE limit may be defined for a PDCCH monitoring window. The UE 120 may determine that the BDs and/or the CCEs configured in a PDCCH monitoring window exceeds the BD limit or the CCE limit. The UE 120 may drop one or more BDs and/or CCEs in the PDCCH monitoring window based at least in part on a dropping rule. In some other aspects, a BD limit or CCE limit may be defined for a span of C consecutive symbols. The UE 120 may determine that the BDs and/or the CCEs configured in a span window exceeds the BD limit or the CCE limit. The UE 120 may drop one or more BDs and/or CCEs in the span based at least in part on a dropping rule.

As shown by reference number 525, the base station 110 may transmit, and the UE 120 may receive, one or more communications (e.g., PDCCH communications, such as downlink control information (DCI) messages) based at least in part on the PDCCH monitoring configuration. For example, the base station 110 may transmit a PDCCH communication using a PDCCH candidate configured by the PDCCH monitoring configuration. The UE 120 may monitor the PDCCH candidate (e.g., in accordance with the PDCCH monitoring configuration), decode the PDCCH candidate, and receive the PDCCH communication based at least in part on monitoring and/or decoding the PDCCH candidate.

As indicated above, FIG. 5 is provided as an example. Other examples may differ from what is described with respect to FIG. 5.

Figure 6:
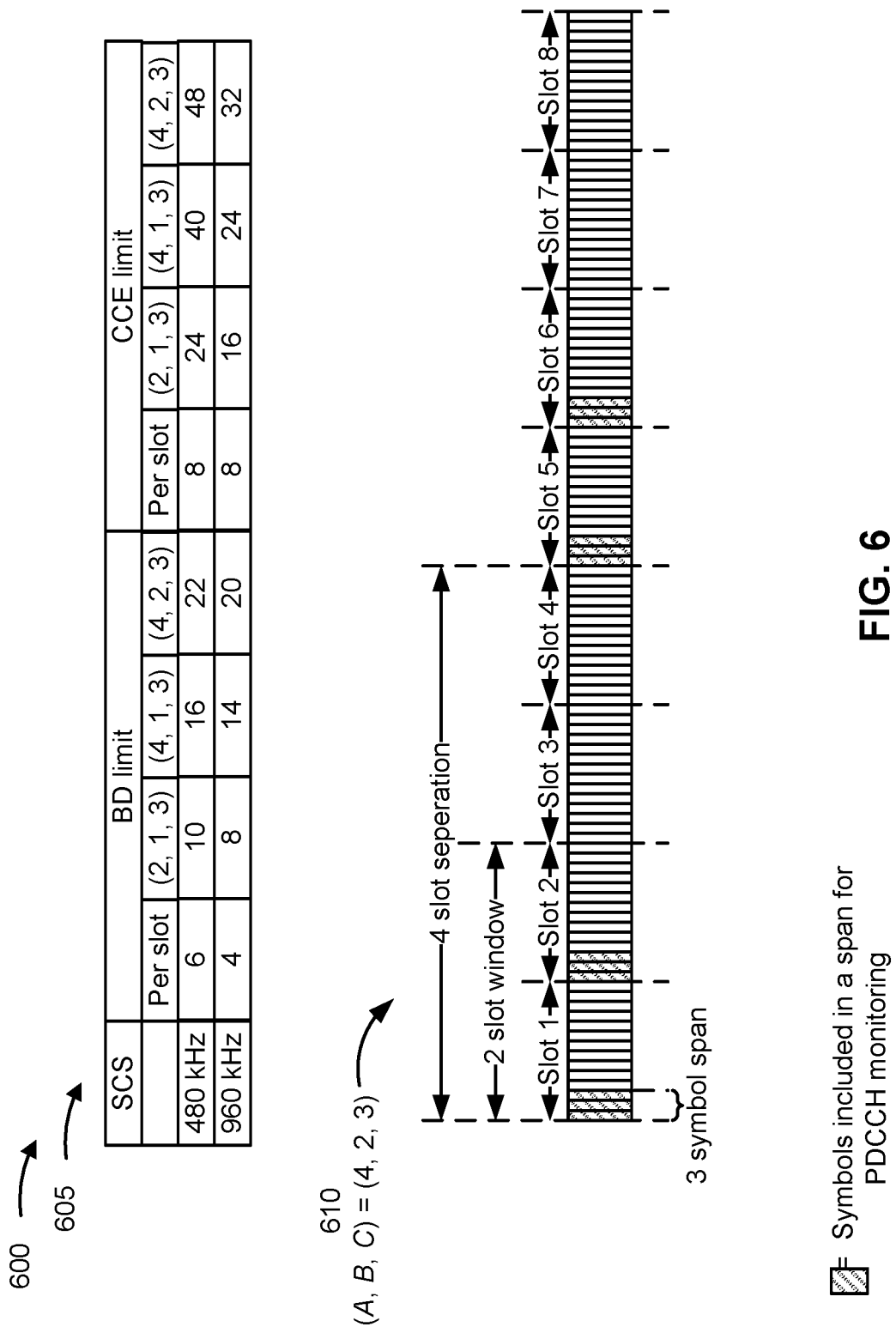
FIG. 6 is a diagram illustrating an example associated with PDCCH monitoring capabilities and configurations for multiple slot PDCCH monitoring, in accordance with the present disclosure.

FIG. 6 is a diagram illustrating an example 600 associated with PDCCH monitoring capabilities and configurations for multiple slot PDCCH monitoring, in accordance with the present disclosure. For example, one or more PDCCH monitoring capabilities for multi-slot PDCCH monitoring are shown by reference number 605. The PDCCH monitoring capabilities may be defined by a combination of values for (A, B, C) as described above in connection with FIG. 5.

For example, as shown in FIG. 5, PDCCH monitoring capabilities of per slot (e.g., a Release 15 PDCCH monitoring capability), (2, 1, 3), (4, 1, 3), and (4, 2, 3) may be defined. BD limits and CCE limits may be defined for different subcarrier spacings. For example, BD limits for each PDCCH monitoring capability may be defined for a subcarrier spacing of 480 kHz and a subcarrier spacing of 960 kHz. Similarly, CCE limits for each PDCCH monitoring capability may be defined for the subcarrier spacing of 480 kHz and the subcarrier spacing of 960 kHz. The BD limits and the CCE limits depicted in FIG. 6 may be per PDCCH monitoring window limits, as described above.

For example, for a PDCCH monitoring capability of (2, 1, 3), the BD limit for the subcarrier spacing of 480 kHz may be 10 (e.g., per PDCCH window), and the BD limit for the subcarrier spacing of 960 kHz may be 8 (e.g., per PDCCH window). As another example, for a PDCCH monitoring capability of (4, 1, 3), the CCE limit for the subcarrier spacing of 480 kHz may be 40 (e.g., per PDCCH window), and the CCE limit for the subcarrier spacing of 960 kHz may be 24 (e.g., per PDCCH window). The PDCCH monitoring capabilities and the values for the BD limits and/or the CCE limits are provided as examples. Other PDCCH monitoring capabilities may be possible. Similarly, different values for the BD limits and/or the CCE limits for the PDCCH monitoring capabilities shown may be possible.

As shown in FIG. 6, for a larger value of A, a larger number of BDs and/or CCEs may be configured for the UE 120. For example, due to the increased amount of time between PDCCH monitoring windows, the UE 120 may have additional processing time. Therefore, the UE 120 may be capable of being configured with a larger number of BDs and/or CCEs when the value of A is larger. Similarly, for a larger value of B, a larger number of BDs and/or CCEs may be configured for the UE 120 because of the additional slots included in a PDCCH monitoring window.

As shown by reference number 610, a PDCCH monitoring configuration for a PDCCH monitoring capability of (4, 2, 3) may be configured for a UE 120. For example, the PDCCH monitoring capability of (4, 2, 3) may be associated with a minimum amount of time between PDCCH monitoring windows of 4 slots, each PDCCH monitoring window may include up to 2 slots, and each span configured for the UE 120 may include up to 3 symbols.

For example, as shown in FIG. 6, a first slot (e.g., slot 1) and a second slot (e.g., slot 2) may be included in a first PDCCH monitoring window. Similarly, a fifth slot (e.g., slot 5) and a sixth slot (e.g., slot 6) may be included in a second PDCCH monitoring window. For example, based at least in part on the value of B (e.g., 2) for the PDCCH monitoring capability of (4, 2, 3), the UE 120 may be configured with PDCCH monitoring windows of up to 2 slots. In other words, the UE 120 may be configured to monitor the PDCCH in up to 2 consecutive slots.

As shown in FIG. 6, a third slot (e.g., slot 3) and a fourth slot (e.g., slot 4) may not be configured for PDCCH monitoring to satisfy the value of A (e.g., 4) for this PDCCH monitoring capability. In other words, based at least in part on the value of A (e.g., 4), there must be at least a 4 slot separation in time between the first slot of the first PDCCH monitoring window (e.g. slot 1) and the first slot of the second PDCCH monitoring window (e.g., slot 5).

As shown in FIG. 6, in the first slot (e.g., slot 1) included in the first PDCCH monitoring window, a span of up to C (e.g., 3) consecutive symbols may be configured for PDCCH monitoring. For example, within the C (e.g., 3) consecutive symbols shown in FIG. 6, the UE 120 may be configured with one or more PDCCH monitoring occasions. Similarly, in the second slot (e.g., slot 2) included in the first PDCCH monitoring window, a span of up to C (e.g., 3) consecutive symbols may be configured for PDCCH monitoring. As shown in FIG. 6, the PDCCH monitoring configuration may be limited to one span for each slot. However, in some aspects, multiple spans may be configured in each slot that is included in a PDCCH monitoring window. Additionally, as shown in FIG. 6, the location of the spans within the slots may be fixed to the first C symbols of the slot. For example, as shown in FIG. 6, a span may be included in the first 3 symbols of a slot. In some aspects, a span may be included in a different C symbols of the slot. In some aspects, a span may be included in a set of C symbols of the first slot (e.g., symbols 6-9) and another span may be included in a different set of C symbols of the second slot (e.g., symbols 1-3).

In this way, the UE 120 may be configured for multi-slot PDCCH monitoring which may be beneficial at higher bands (e.g., a 60 GHz band) and/or when using higher subcarrier spacings (e.g., 480 kHz subcarrier spacing and/or 960 kHz subcarrier spacing). For example, by configuring multi-slot PDCCH monitoring, a BD limit and/or a CCE limit for the UE 120 can be increased as compared to a per slot BD limit or a per slot CCE limit. Increasing the BD limit and/or the CCE limit increases scheduling flexibility and increases opportunities for the UE to receive PDCCH grants from a base station 110. As another example, due to the shorter slot durations when using the higher subcarrier spacings, if the UE 120 were to be configured for PDCCH monitoring in slot 3 and slot 4 shown in FIG. 6, the UE 120 may not have an opportunity to enter a sleep state (e.g., a micro-sleep state) if no PDCCH grants were detected in slot 1 or slot 2. However, based at least in part on the PDCCH monitoring capability of (4, 2, 3), the UE 120 may have an opportunity to enter a sleep state (e.g., a micro-sleep state) during slot 3 and slot 4 to conserve power if no PDCCH grants were detected in slot 1 or slot 2. Thus, a battery life of the UE 120 may be improved based at least in part on the increased opportunities to enter a sleep state (e.g., a micro-sleep state) when using multi-slot PDCCH monitoring at higher bands (e.g., a 60 GHz band) and/or when using higher subcarrier spacings (e.g., 480 kHz subcarrier spacing and/or 960 kHz subcarrier spacing).

As indicated above, FIG. 6 is provided as an example. Other examples may differ from what is described with respect to FIG. 6.

Figure 7:
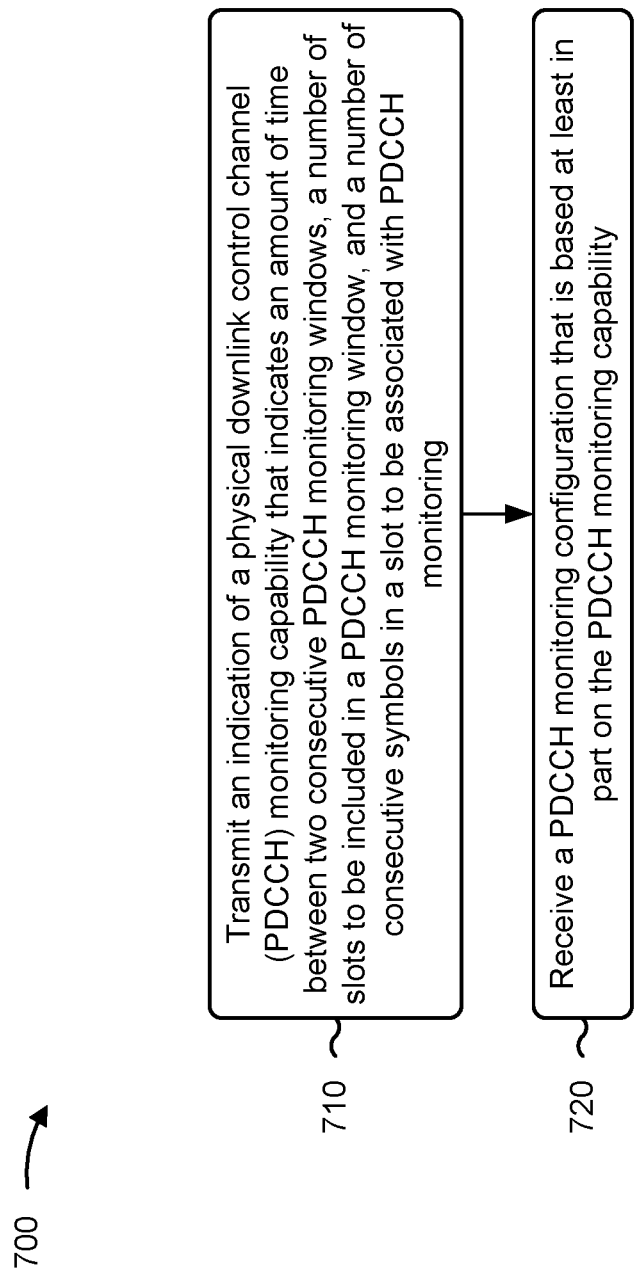
FIGS. 7 and 8 are diagrams illustrating example processes associated with a UE monitoring capability for multiple slot PDCCH monitoring, in accordance with the present disclosure.

FIG. 7 is a diagram illustrating an example process 700 performed, for example, by a UE, in accordance with the present disclosure. Example process 700 is an example where the UE (e.g., UE 120) performs operations associated with a UE monitoring capability for multiple slot PDCCH monitoring.

As shown in FIG. 7, in some aspects, process 700 may include transmitting an indication of a PDCCH monitoring capability that indicates an amount of time between two consecutive PDCCH monitoring windows, a number of slots to be included in a PDCCH monitoring window, and a number of consecutive symbols in a slot to be associated with PDCCH monitoring (block 710). For example, the UE (e.g., using transmission component 904, depicted in FIG. 9) may transmit an indication of a PDCCH monitoring capability that indicates an amount of time between two consecutive PDCCH monitoring windows, a number of slots to be included in a PDCCH monitoring window, and a number of consecutive symbols in a slot to be associated with PDCCH monitoring, as described above.

As further shown in FIG. 7, in some aspects, process 700 may include receiving a PDCCH monitoring configuration that is based at least in part on the PDCCH monitoring capability (block 720). For example, the UE (e.g., using reception component 902, depicted in FIG. 9) may receive a PDCCH monitoring configuration that is based at least in part on the PDCCH monitoring capability, as described above.

Process 700 may include additional aspects, such as any single aspect or any combination of aspects described below and/or in connection with one or more other processes described elsewhere herein.

In a first aspect, the amount of time between two consecutive PDCCH monitoring windows indicates a minimum amount of time between a first slot of a first PDCCH monitoring window and a first slot of a second PDCCH monitoring window when the first PDCCH monitoring window and the second PDCCH monitoring window are consecutive in a time domain.

In a second aspect, alone or in combination with the first aspect, the number of consecutive symbols in a slot to be associated with PDCCH monitoring indicates a number of consecutive symbols to be included in a span associated with PDCCH monitoring.

In a third aspect, alone or in combination with one or more of the first and second aspects, the PDCCH monitoring configuration is associated with a PDCCH candidate limit or a CCE limit, and wherein the PDCCH candidate limit or the CCE limit is defined for the PDCCH monitoring window.

In a fourth aspect, alone or in combination with one or more of the first through third aspects, the PDCCH monitoring configuration is associated with a PDCCH candidate limit or a CCE limit, and wherein the PDCCH candidate limit or the CCE limit is defined for a span associated with PDCCH monitoring.

In a fifth aspect, alone or in combination with one or more of the first through fourth aspects, receiving the PDCCH monitoring configuration comprises receiving an indication of one or more PDCCH monitoring occasions for a slot associated with the PDCCH monitoring window, wherein the one or more PDCCH monitoring occasions are included in one or more spans included in the slot.

In a sixth aspect, alone or in combination with one or more of the first through fifth aspects, receiving the PDCCH monitoring configuration comprises receiving an indication of a span for PDCCH monitoring included in a slot associated with the PDCCH monitoring window, wherein a position of the span in the slot is fixed for slots associated with the PDCCH monitoring configuration.

In a seventh aspect, alone or in combination with one or more of the first through sixth aspects, the position of the span in the slot is a first one or more symbols of the slot, wherein a quantity of the one or more symbols is the number of consecutive symbols.

In an eighth aspect, alone or in combination with one or more of the first through seventh aspects, transmitting the indication of the PDCCH monitoring capability comprises transmitting a first PDCCH monitoring capability associated with a subcarrier spacing and a second PDCCH monitoring capability associated with the subcarrier spacing.

In a ninth aspect, alone or in combination with one or more of the first through eighth aspects, transmitting the indication of the PDCCH monitoring capability comprises transmitting a first PDCCH monitoring capability associated with a first subcarrier spacing and a second PDCCH monitoring capability associated with a second subcarrier spacing.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
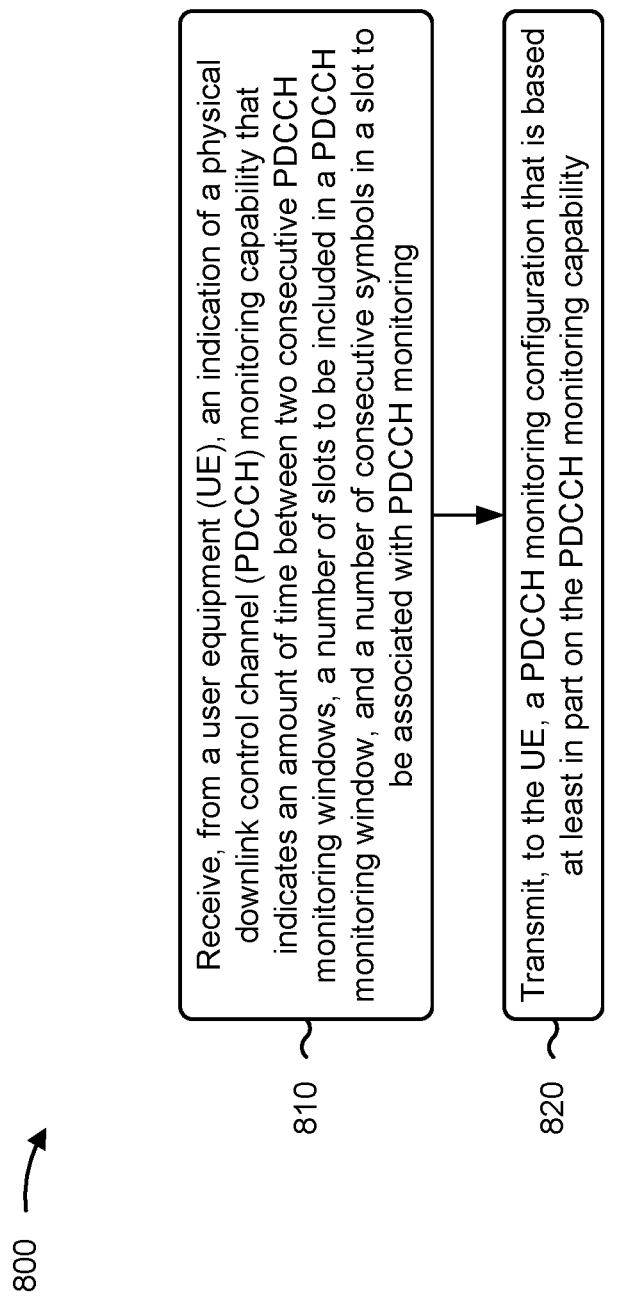

FIG. 8 is a diagram illustrating an example process 800 performed, for example, by a base station, in accordance with the present disclosure. Example process 800 is an example where the base station (e.g., base station 110) performs operations associated with a UE monitoring capability for multiple slot PDCCH monitoring.

As shown in FIG. 8, in some aspects, process 800 may include receiving, from a UE, an indication of a PDCCH monitoring capability that indicates an amount of time between two consecutive PDCCH monitoring windows, a number of slots to be included in a PDCCH monitoring window, and a number of consecutive symbols in a slot to be associated with PDCCH monitoring (block 810). For example, the base station (e.g., using reception component 1002, depicted in FIG. 10) may receive, from a UE, an indication of a PDCCH monitoring capability that indicates an amount of time between two consecutive PDCCH monitoring windows, a number of slots to be included in a PDCCH monitoring window, and a number of consecutive symbols in a slot to be associated with PDCCH monitoring, as described above.

As further shown in FIG. 8, in some aspects, process 800 may include transmitting, to the UE, a PDCCH monitoring configuration that is based at least in part on the PDCCH monitoring capability (block 820). For example, the base station (e.g., using transmission component 1004, depicted in FIG. 10) may transmit, to the UE, a PDCCH monitoring configuration that is based at least in part on the PDCCH monitoring capability, as described above.

Process 800 may include additional aspects, such as any single aspect or any combination of aspects described below and/or in connection with one or more other processes described elsewhere herein.

In a first aspect, the amount of time between two consecutive PDCCH monitoring windows indicates a minimum amount of time between a first slot of a first PDCCH monitoring window and a first slot of a second PDCCH monitoring window when the first PDCCH monitoring window and the second PDCCH monitoring window are consecutive in a time domain.

In a second aspect, alone or in combination with the first aspect, the number of consecutive symbols in a slot to be associated with PDCCH monitoring indicates a number of consecutive symbols to be included in a span associated with PDCCH monitoring.

In a third aspect, alone or in combination with one or more of the first and second aspects, the PDCCH monitoring configuration is associated with a PDCCH candidate limit or a CCE limit, and wherein the PDCCH candidate limit or the CCE limit is defined for the PDCCH monitoring window.

In a fourth aspect, alone or in combination with one or more of the first through third aspects, the PDCCH monitoring configuration is associated with a PDCCH candidate limit or a CCE limit, and wherein the PDCCH candidate limit or the CCE limit is defined for a span associated with PDCCH monitoring.

In a fifth aspect, alone or in combination with one or more of the first through fourth aspects, transmitting the PDCCH monitoring configuration comprises transmitting an indication of one or more PDCCH monitoring occasions for a slot associated with the PDCCH monitoring window, wherein the one or more PDCCH monitoring occasions are included in one or more spans included in the slot.

In a sixth aspect, alone or in combination with one or more of the first through fifth aspects, transmitting the PDCCH monitoring configuration comprises transmitting an indication of a span for PDCCH monitoring included in a slot associated with the PDCCH monitoring window, wherein a position of the span in the slot is fixed for slots associated with the PDCCH monitoring configuration.

In a seventh aspect, alone or in combination with one or more of the first through sixth aspects, the position of the span in the slot is a first one or more symbols of the slot, wherein a quantity of the one or more symbols is the number of consecutive symbols.

In an eighth aspect, alone or in combination with one or more of the first through seventh aspects, receiving the indication of the PDCCH monitoring capability comprises receiving a first PDCCH monitoring capability associated with a subcarrier spacing and a second PDCCH monitoring capability associated with the subcarrier spacing.

In a ninth aspect, alone or in combination with one or more of the first through eighth aspects, receiving the indication of the PDCCH monitoring capability comprises receiving a first PDCCH monitoring capability associated with a first subcarrier spacing and a second PDCCH monitoring capability associated with a second subcarrier spacing.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
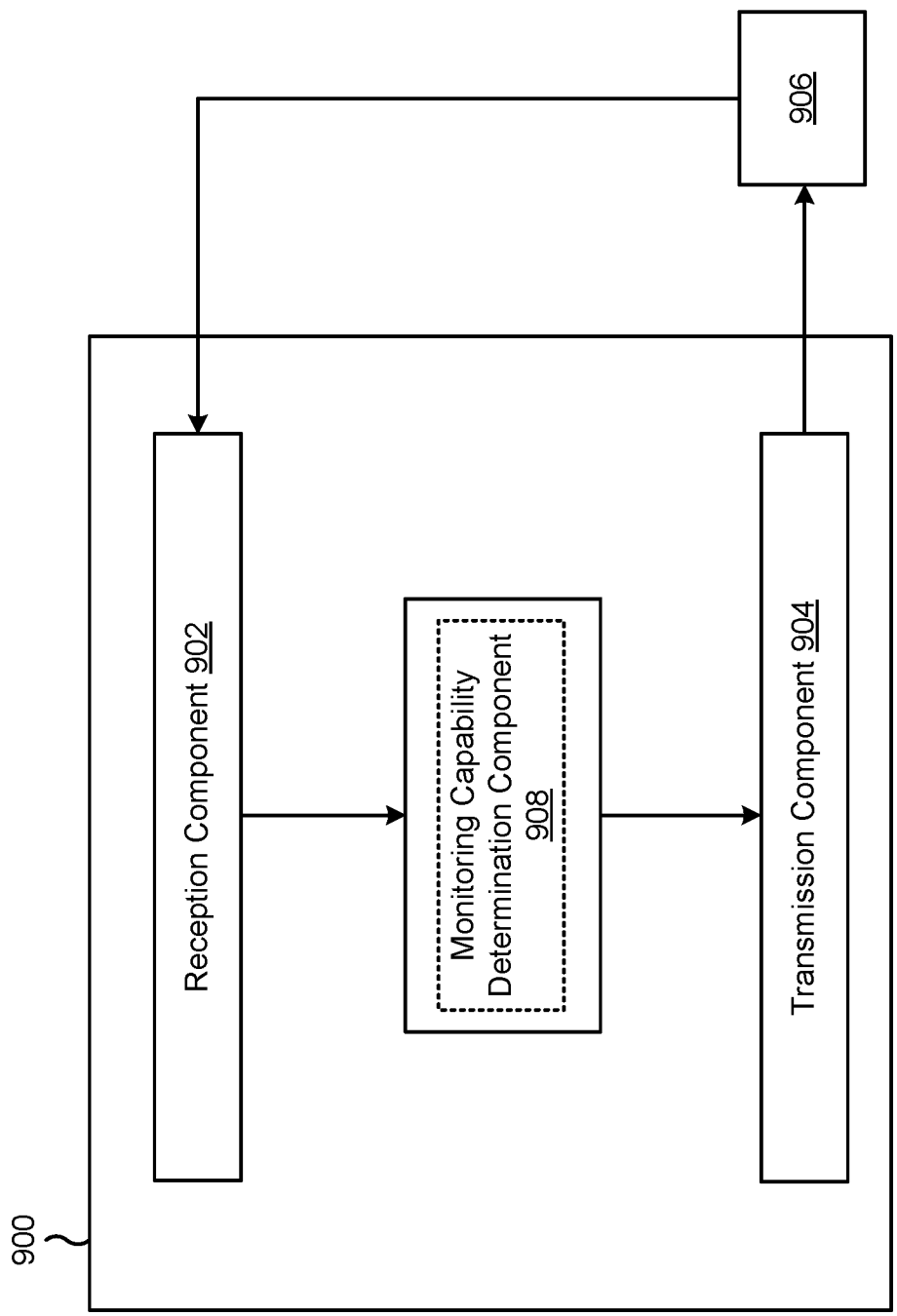
FIGS. 9 and 10 are block diagrams of example apparatuses for wireless communication, in accordance with the present disclosure.

FIG. 9 is a block diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a monitoring capability determination component 908, among other examples.

In some aspects, the apparatus 900 may be configured to perform one or more operations described herein in connection with FIGS. 5 and 6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The transmission component 904 may transmit an indication of a PDCCH monitoring capability that indicates an amount of time between two consecutive PDCCH monitoring windows, a number of slots to be included in a PDCCH monitoring window, and a number of consecutive symbols in a slot to be associated with PDCCH monitoring. The reception component 902 may receive a PDCCH monitoring configuration that is based at least in part on the PDCCH monitoring capability.

The monitoring capability determination component 908 may determine one or more PDCCH monitoring capabilities of the UE for one or more subcarrier spacings supported by the apparatus 900.

The reception component 902 may receive an indication of one or more PDCCH monitoring occasions for a slot associated with the PDCCH monitoring window, wherein the one or more PDCCH monitoring occasions are included in one or more spans included in the slot. The reception component 902 may receive an indication of a span for PDCCH monitoring included in a slot associated with the PDCCH monitoring window, wherein a position of the span in the slot is fixed for slots associated with the PDCCH monitoring configuration.

The transmission component 904 may transmit a first PDCCH monitoring capability associated with a subcarrier spacing and a second PDCCH monitoring capability associated with the subcarrier spacing. The transmission component 904 may transmit a first PDCCH monitoring capability associated with a first subcarrier spacing and a second PDCCH monitoring capability associated with a second subcarrier spacing.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
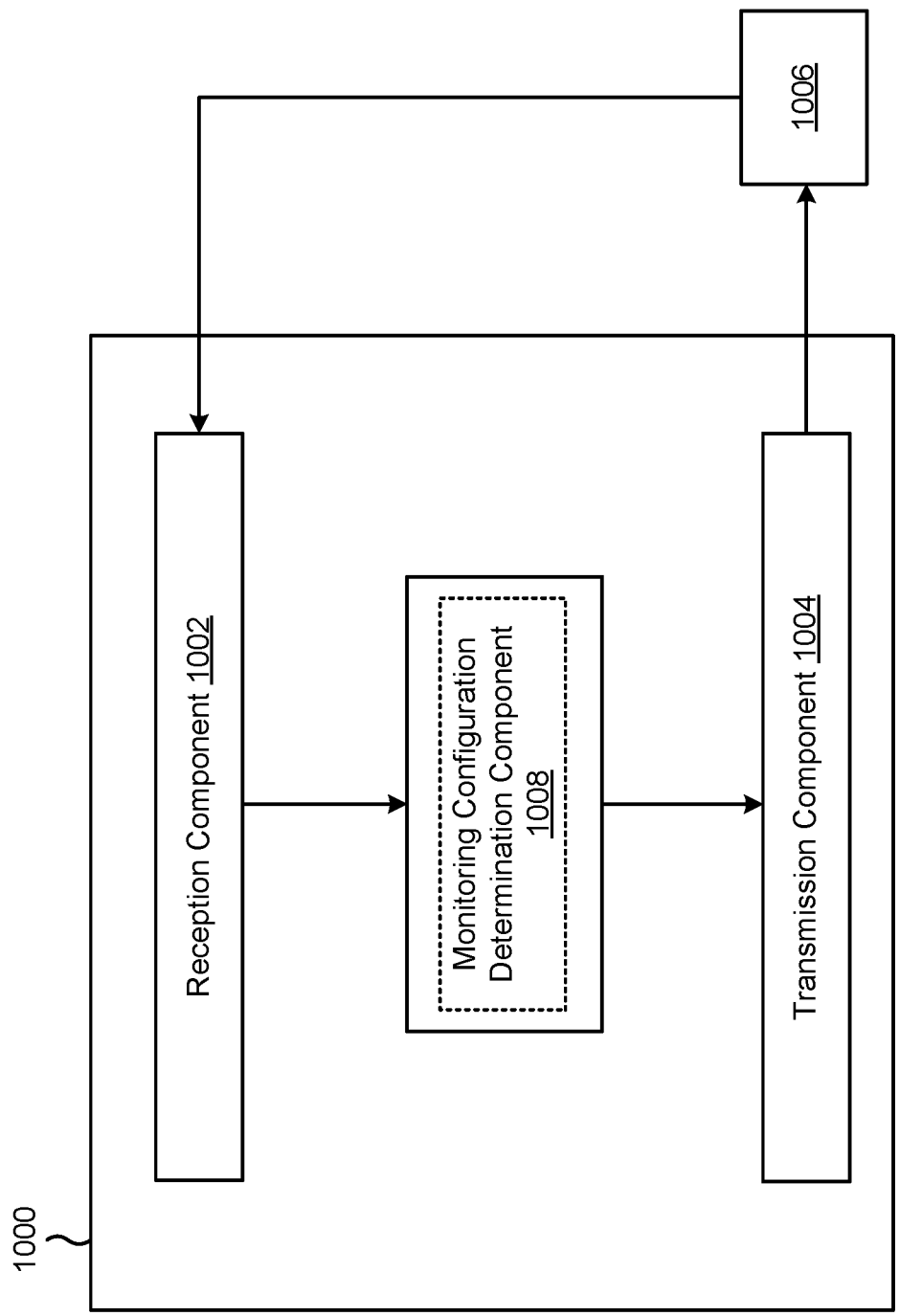

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a monitoring configuration determination component 1008, among other examples.

In some aspects, the apparatus 1000 may be configured to perform one or more operations described herein in connection with FIGS. 5 and 6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The reception component 1002 may receive, from a UE, an indication of a PDCCH monitoring capability that indicates an amount of time between two consecutive PDCCH monitoring windows, a number of slots to be included in a PDCCH monitoring window, and a number of consecutive symbols in a slot to be associated with PDCCH monitoring. The transmission component 1004 may transmit, to the UE, a PDCCH monitoring configuration that is based at least in part on the PDCCH monitoring capability.

The monitoring configuration determination component 1008 may determine the PDCCH monitoring configuration based at least in part on at least one of the PDCCH monitoring capability or a subcarrier spacing to be used for communications between the apparatus 1000 and the UE.

The transmission component 1004 may transmit an indication of one or more PDCCH monitoring occasions for a slot associated with the PDCCH monitoring window, wherein the one or more PDCCH monitoring occasions are included in one or more spans included in the slot. The transmission component 1004 may transmit an indication of a span for PDCCH monitoring included in a slot associated with the PDCCH monitoring window, wherein a position of the span in the slot is fixed for slots associated with the PDCCH monitoring configuration.

The reception component 1002 may receive, from the UE, a first PDCCH monitoring capability associated with a subcarrier spacing and a second PDCCH monitoring capability associated with the subcarrier spacing. The reception component 1002 may receive, from the UE, a first PDCCH monitoring capability associated with a first subcarrier spacing and a second PDCCH monitoring capability associated with a second subcarrier spacing.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: transmitting an indication of a physical downlink control channel (PDCCH) monitoring capability that indicates an amount of time between two consecutive PDCCH monitoring windows, a number of slots to be included in a PDCCH monitoring window, and a number of consecutive symbols in a slot to be associated with PDCCH monitoring; and receiving a PDCCH monitoring configuration that is based at least in part on the PDCCH monitoring capability.

Aspect 2: The method of Aspect 1, wherein the amount of time between two consecutive PDCCH monitoring windows indicates a minimum amount of time between a first slot of a first PDCCH monitoring window and a first slot of a second PDCCH monitoring window when the first PDCCH monitoring window and the second PDCCH monitoring window are consecutive in a time domain.

Aspect 3: The method of any of Aspects 1-2, wherein the number of consecutive symbols in the slot to be associated with PDCCH monitoring indicates the number of consecutive symbols to be included in a span associated with PDCCH monitoring.

Aspect 4: The method of any of Aspects 1-3, wherein the PDCCH monitoring configuration is associated with a PDCCH candidate limit or a control channel element (CCE) limit, and wherein the PDCCH candidate limit or the CCE limit is defined for the PDCCH monitoring window.

Aspect 5: The method of any of Aspects 1-3, wherein the PDCCH monitoring configuration is associated with a PDCCH candidate limit or a control channel element (CCE) limit, and wherein the PDCCH candidate limit or the CCE limit is defined for a span associated with PDCCH monitoring.

Aspect 6: The method of any of Aspects 1-5, wherein receiving the PDCCH monitoring configuration comprises: receiving an indication of one or more PDCCH monitoring occasions for a slot associated with the PDCCH monitoring window, wherein the one or more PDCCH monitoring occasions are included in one or more spans included in the slot.

Aspect 7: The method of any of Aspects 1-6, wherein receiving the PDCCH monitoring configuration comprises: receiving an indication of a span for PDCCH monitoring included in a slot associated with the PDCCH monitoring window, wherein a position of the span in the slot is fixed for slots associated with the PDCCH monitoring configuration.

Aspect 8: The method of Aspect 7, wherein the position of the span in the slot is a first one or more symbols of the slot, wherein a quantity of the one or more symbols is the number of consecutive symbols.

Aspect 9: The method of any of Aspects 1-8, wherein transmitting the indication of the PDCCH monitoring capability comprises: transmitting a first PDCCH monitoring capability associated with a subcarrier spacing and a second PDCCH monitoring capability associated with the subcarrier spacing.

Aspect 10: The method of any of Aspects 1-9, wherein transmitting the indication of the PDCCH monitoring capability comprises: transmitting a first PDCCH monitoring capability associated with a first subcarrier spacing and a second PDCCH monitoring capability associated with a second subcarrier spacing.

Aspect 11: A method of wireless communication performed by a base station, comprising: receiving, from a user equipment (UE), an indication of a physical downlink control channel (PDCCH) monitoring capability that indicates an amount of time between two consecutive PDCCH monitoring windows, a number of slots to be included in a PDCCH monitoring window, and a number of consecutive symbols in a slot to be associated with PDCCH monitoring; and transmitting, to the UE, a PDCCH monitoring configuration that is based at least in part on the PDCCH monitoring capability.

Aspect 12: The method of Aspect 11, wherein the amount of time between two consecutive PDCCH monitoring windows indicates a minimum amount of time between a first slot of a first PDCCH monitoring window and a first slot of a second PDCCH monitoring window when the first PDCCH monitoring window and the second PDCCH monitoring window are consecutive in a time domain.

Aspect 13: The method of any of Aspects 11-12, wherein the number of consecutive symbols in the slot to be associated with PDCCH monitoring indicates the number of consecutive symbols to be included in a span associated with PDCCH monitoring.

Aspect 14: The method of any of Aspects 11-13, wherein the PDCCH monitoring configuration is associated with a PDCCH candidate limit or a control channel element (CCE) limit, and wherein the PDCCH candidate limit or the CCE limit is defined for the PDCCH monitoring window.

Aspect 15: The method of any of Aspects 11-13, wherein the PDCCH monitoring configuration is associated with a PDCCH candidate limit or a control channel element (CCE) limit, and wherein the PDCCH candidate limit or the CCE limit is defined for a span associated with PDCCH monitoring.

Aspect 16: The method of any of Aspects 11-15, wherein transmitting the PDCCH monitoring configuration comprises: transmitting an indication of one or more PDCCH monitoring occasions for a slot associated with the PDCCH monitoring window, wherein the one or more PDCCH monitoring occasions are included in one or more spans included in the slot.

Aspect 17: The method of any of Aspects 11-16, wherein transmitting the PDCCH monitoring configuration comprises: transmitting an indication of a span for PDCCH monitoring included in a slot associated with the PDCCH monitoring window, wherein a position of the span in the slot is fixed for slots associated with the PDCCH monitoring configuration.

Aspect 18: The method of Aspect 17, wherein the position of the span in the slot is a first one or more symbols of the slot, wherein a quantity of the one or more symbols is the number of consecutive symbols.

Aspect 19: The method of any of Aspects 11-18, wherein receiving the indication of the PDCCH monitoring capability comprises: receiving a first PDCCH monitoring capability associated with a subcarrier spacing and a second PDCCH monitoring capability associated with the subcarrier spacing.

Aspect 20: The method of any of Aspects 11-19, wherein receiving the indication of the PDCCH monitoring capability comprises: receiving a first PDCCH monitoring capability associated with a first subcarrier spacing and a second PDCCH monitoring capability associated with a second subcarrier spacing.

Aspect 21: An apparatus for wireless communication at a device, comprising a processor; memory coupled with the processor; and instructions stored in the memory and executable by the processor to cause the apparatus to perform the method of one or more of Aspects 1-10.

Aspect 22: A device for wireless communication, comprising a memory and one or more processors coupled to the memory, the memory and the one or more processors configured to perform the method of one or more of Aspects 1-10.

Aspect 23: An apparatus for wireless communication, comprising at least one means for performing the method of one or more of Aspects 1-10.

Aspect 24: A non-transitory computer-readable medium storing code for wireless communication, the code comprising instructions executable by a processor to perform the method of one or more of Aspects 1-10.

Aspect 25: A non-transitory computer-readable medium storing a set of instructions for wireless communication, the set of instructions comprising one or more instructions that, when executed by one or more processors of a device, cause the device to perform the method of one or more of Aspects 1-10.

Aspect 26: An apparatus for wireless communication at a device, comprising a processor; memory coupled with the processor; and instructions stored in the memory and executable by the processor to cause the apparatus to perform the method of one or more of Aspects 11-20.

Aspect 27: A device for wireless communication, comprising a memory and one or more processors coupled to the memory, the memory and the one or more processors configured to perform the method of one or more of Aspects 11-20.

Aspect 28: An apparatus for wireless communication, comprising at least one means for performing the method of one or more of Aspects 11-20.

Aspect 29: A non-transitory computer-readable medium storing code for wireless communication, the code comprising instructions executable by a processor to perform the method of one or more of Aspects 11-20.

Aspect 30: A non-transitory computer-readable medium storing a set of instructions for wireless communication, the set of instructions comprising one or more instructions that, when executed by one or more processors of a device, cause the device to perform the method of one or more of Aspects 11-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      transmit a first indication of a first physical downlink control channel (PDCCH) monitoring capability for a first subcarrier spacing, the first indication indicating support for multi-slot PDCCH monitoring, a span of three consecutive symbols within a slot for a monitoring occasion associated with the multi-slot PDCCH monitoring, and a first gap between spans selected from a plurality of gaps;
      transmit a second indication of a second PDCCH monitoring capability for a second subcarrier spacing, the second indication indicating the span of three consecutive symbols within a slot for a monitoring occasion associated with the multi-slot PDCCH monitoring, and a second gap between spans, the second gap being one of the plurality of gaps; and
      receive a PDCCH monitoring configuration that is based at least in part on the first PDCCH monitoring capability or the second PDCCH monitoring capability.

2. The UE of claim 1, wherein the span of three consecutive symbols comprises a span of three consecutive symbols in a first three symbols of each slot of multiple consecutive slots associated with the multi-slot PDCCH monitoring.

3. The UE of claim 1, wherein the first indication further indicates an amount of time between consecutive PDCCH monitoring windows and a number of slots to be included in each PDCCH monitoring window.

4. The UE of claim 3, wherein the amount of time between two of the consecutive PDCCH monitoring windows indicates a minimum amount of time between a first slot of a first PDCCH monitoring window and a first slot of a second PDCCH monitoring window when the first PDCCH monitoring window and the second PDCCH monitoring window are consecutive in a time domain.

5. The UE of claim 1, wherein the PDCCH monitoring configuration is associated with a PDCCH candidate limit or a control channel element (CCE) limit, and wherein the PDCCH candidate limit or the CCE limit is defined for a PDCCH monitoring window.

6. The UE of claim 1, wherein the PDCCH monitoring configuration is associated with a PDCCH candidate limit or a control channel element (CCE) limit, and wherein the PDCCH candidate limit or the CCE limit is defined for the span.

7. The UE of claim 1, wherein the one or more processors, to receive the PDCCH monitoring configuration, are configured to:
receive an indication of one or more PDCCH monitoring occasions, wherein each of the one or more PDCCH monitoring occasions are included in three consecutive symbols.

8. The UE of claim 1, wherein a position of the span in the slot is fixed for each slot of multiple consecutive slots associated with the PDCCH monitoring configuration.

9. The UE of claim 1, wherein the first gap is 4 symbols or 7 symbols, and the second gap is 7 symbols.

10. The UE of claim 1, wherein the first subcarrier spacing is 480 kHz and the second subcarrier spacing is 960 kHz.

11. A network node for wireless communication, comprising:
one or more memories; and
one or more processors, coupled to the one or more memories, configured to:
receive, from a user equipment (UE), a first indication of a first physical downlink control channel (PDCCH) monitoring capability for a first subcarrier spacing, the first indication indicating support for multi-slot PDCCH monitoring, a span of three consecutive symbols within a slot for a monitoring occasion associated with the multi-slot PDCCH monitoring, and a first gap between spans selected from a plurality of gaps;
receive a second indication of a second PDCCH monitoring capability for a second subcarrier spacing, the second indication indicating the span of three consecutive symbols within a slot for a monitoring occasion associated with the multi-slot PDCCH monitoring, and a second gap between spans, the second gap being one of the plurality of gaps; and
transmit, to the UE, a PDCCH monitoring configuration that is based at least in part on the first PDCCH monitoring capability or the second PDCCH monitoring capability.

12. The network node of claim 11, wherein the first indication further indicates an amount of time between consecutive PDCCH monitoring windows and a number of slots to be included in each PDCCH monitoring window.

13. The network node of claim 12, wherein the amount of time between two of the consecutive PDCCH monitoring windows indicates a minimum amount of time between a first slot of a first PDCCH monitoring window and a first slot of a second PDCCH monitoring window when the first PDCCH monitoring window and the second PDCCH monitoring window are consecutive in a time domain.

14. The network node of claim 11, wherein the PDCCH monitoring configuration is associated with a PDCCH candidate limit or a control channel element (CCE) limit, and wherein the PDCCH candidate limit or the CCE limit is defined for a PDCCH monitoring window.

15. The network node of claim 11, wherein the PDCCH monitoring configuration is associated with a PDCCH candidate limit or a control channel element (CCE) limit, and wherein the PDCCH candidate limit or the CCE limit is defined for the span.

16. The network node of claim 11, wherein the one or more processors, to receive the indication of the PDCCH monitoring capability, are configured to:
receive a first PDCCH monitoring capability associated with a subcarrier spacing and a second PDCCH monitoring capability associated with the subcarrier spacing.

17. The network node of claim 11, wherein the one or more processors, to receive the indication of the PDCCH monitoring capability, are configured to:
receive a first PDCCH monitoring capability associated with a first subcarrier spacing and a second PDCCH monitoring capability associated with a second subcarrier spacing.

18. A method of wireless communication performed by a user equipment (UE), comprising:
transmitting a first indication of a first physical downlink control channel (PDCCH) monitoring capability for a first subcarrier spacing, the first indication indicating support for multi-slot PDCCH monitoring, a span of three consecutive symbols within a slot for a monitoring occasion associated with the multi-slot PDCCH monitoring, and a first gap between spans selected from a plurality of gaps;
transmitting a second indication of a second PDCCH monitoring capability for a second subcarrier spacing, the second indication indicating the span of three consecutive symbols within a slot for a monitoring occasion associated with the multi-slot PDCCH monitoring, and a second gap between spans, the second gap being one of the plurality of gaps; and
receiving a PDCCH monitoring configuration that is based at least in part on the first PDCCH monitoring capability or the second PDCCH monitoring capability.

19. The method of claim 18, wherein the first indication further indicates an amount of time between consecutive PDCCH monitoring windows and a number of slots to be included in each PDCCH monitoring window.

20. The method of claim 19, wherein the amount of time between two of the consecutive PDCCH monitoring windows indicates a minimum amount of time between a first slot of a first PDCCH monitoring window and a first slot of a second PDCCH monitoring window when the first PDCCH monitoring window and the second PDCCH monitoring window are consecutive in a time domain.

* * * * *